United States Patent
Meek et al.

(10) Patent No.: US 7,991,916 B2
(45) Date of Patent: Aug. 2, 2011

(54) PER-USER APPLICATION RENDERING IN THE PRESENCE OF APPLICATION SHARING

(75) Inventors: Brian Meek, Redmond, WA (US); David Nichols, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 472 days.

(21) Appl. No.: 11/637,584

(22) Filed: Dec. 12, 2006

(65) Prior Publication Data
US 2007/0156689 A1    Jul. 5, 2007

Related U.S. Application Data

(63) Continuation-in-part of application No. 11/218,294, filed on Sep. 1, 2005, now Pat. No. 7,568,005.

(51) Int. Cl.
*G06F 15/16* (2006.01)
*G06F 17/00* (2006.01)
*G06F 17/20* (2006.01)

(52) U.S. Cl. ........ 709/248; 709/208; 709/227; 709/229; 709/204; 715/200; 715/203; 715/209; 715/733; 715/751; 715/753; 715/759

(58) Field of Classification Search .......... 715/200, 715/203, 209, 733, 751, 753, 759; 709/248, 709/208, 227, 229, 204
See application file for complete search history.

(56) References Cited

U.S. PATENT DOCUMENTS

| | | | | |
|---|---|---|---|---|
| 4,974,173 A | * | 11/1990 | Stefik et al. | 715/751 |
| 5,008,853 A | * | 4/1991 | Bly et al. | 715/751 |
| 5,107,443 A | * | 4/1992 | Smith et al. | 715/751 |
| 5,220,657 A | * | 6/1993 | Bly et al. | 711/152 |
| 5,557,725 A | | 9/1996 | Ansberry et al. | |
| 5,745,711 A | | 4/1998 | Kitahara et al. | |
| 5,758,110 A | | 5/1998 | Boss et al. | |
| 5,760,769 A | | 6/1998 | Petrie | |
| 5,790,127 A | | 8/1998 | Anderson et al. | |
| 5,844,553 A | | 12/1998 | Hao et al. | |
| 6,029,191 A | | 2/2000 | Kurashima | |
| 6,199,116 B1 | * | 3/2001 | May et al. | 719/310 |
| 6,219,057 B1 | * | 4/2001 | Carey et al. | 345/419 |
| 6,223,212 B1 | | 4/2001 | Batty et al. | |
| 6,285,363 B1 | | 9/2001 | Mairs et al. | |

(Continued)

OTHER PUBLICATIONS

"Interwise Connect™", http://www.interwise.com/PDF/Interwise_ProductDS.pdf.

(Continued)

*Primary Examiner* — Dohm Chankong
(74) *Attorney, Agent, or Firm* — Hope Baldauff Hartman, LLC

(57) ABSTRACT

Architecture that allows users in an application sharing environment to separately view portions of data that are not part of the current shared view. An enhanced application sharing component is provided that facilitates rendering the application data multiple times for a correspondingly similar number of simultaneous users, and sending the additional renderings to the other users for interaction. Each user client includes an application sharing viewer that composites the per-user renderings onto the base shared image of the user client to create a per-user view of the shared document. The enhanced sharing component renders the portion of the data that is requested by the remote user as a bitmap and passes the bitmap along with coordinate information to the client rendering program presentation with the shared data view. The coordinate information indicates where on the shared screen of the remote client the bitmap is overlayed to produce a seamless experience.

9 Claims, 18 Drawing Sheets

U.S. PATENT DOCUMENTS

| | | | |
|---|---|---|---|
| 6,308,199 B1 | 10/2001 | Katsurabayashi | |
| 6,411,989 B1* | 6/2002 | Anupam et al. | 709/204 |
| 6,466,250 B1 | 10/2002 | Hein et al. | |
| 6,564,246 B1* | 5/2003 | Varma et al. | 709/205 |
| 6,584,493 B1 | 6/2003 | Butler | |
| 6,654,785 B1* | 11/2003 | Craig | 709/203 |
| 6,687,878 B1 | 2/2004 | Eintracht et al. | |
| 6,748,420 B1* | 6/2004 | Quatrano et al. | 709/205 |
| 6,859,928 B2* | 2/2005 | Wright | 718/102 |
| 6,891,552 B1 | 5/2005 | Bush | |
| 7,047,279 B1 | 5/2006 | Beams et al. | |
| 7,222,305 B2* | 5/2007 | Teplov et al. | 715/751 |
| 7,293,243 B1* | 11/2007 | Ben-Shachar et al. | 715/781 |
| 7,356,563 B1 | 4/2008 | Leichtling et al. | |
| 7,454,460 B2* | 11/2008 | Ivashin | 709/203 |
| 7,568,005 B2 | 7/2009 | Nichols et al. | |
| 7,660,899 B2* | 2/2010 | Gavrilescu et al. | 709/227 |
| 7,734,802 B1* | 6/2010 | Gay et al. | 709/231 |
| 7,818,679 B2* | 10/2010 | Clarke | 715/751 |
| 2001/0000811 A1 | 5/2001 | May et al. | |
| 2002/0138624 A1* | 9/2002 | Esenther | 709/227 |
| 2002/0198941 A1* | 12/2002 | Gavrilescu et al. | 709/205 |
| 2003/0179230 A1* | 9/2003 | Seidman | 345/750 |
| 2004/0039827 A1 | 2/2004 | Thomas et al. | |
| 2004/0181577 A1* | 9/2004 | Skurikhin et al. | 709/204 |
| 2004/0181579 A1* | 9/2004 | Huck et al. | 709/205 |
| 2004/0194026 A1 | 9/2004 | Barrus et al. | |
| 2004/0252185 A1 | 12/2004 | Vernon et al. | |
| 2005/0033817 A1 | 2/2005 | Wei | |
| 2005/0132045 A1 | 6/2005 | Hornback, Jr. et al. | |
| 2005/0223334 A1 | 10/2005 | Guido et al. | |
| 2005/0234943 A1* | 10/2005 | Clarke | 707/100 |
| 2005/0266835 A1 | 12/2005 | Agrawal et al. | |
| 2005/0278642 A1* | 12/2005 | Chang et al. | 715/751 |
| 2006/0010392 A1 | 1/2006 | Noel et al. | |
| 2006/0167996 A1 | 7/2006 | Orsolini et al. | |
| 2006/0168533 A1 | 7/2006 | Yip et al. | |
| 2006/0190839 A1 | 8/2006 | Ben-Shachar et al. | |
| 2006/0218498 A1* | 9/2006 | Henderson et al. | 715/751 |
| 2006/0235927 A1* | 10/2006 | Bhakta et al. | 709/204 |
| 2007/0074122 A1 | 3/2007 | Nichols et al. | |
| 2007/0118794 A1* | 5/2007 | Hollander et al. | 715/512 |
| 2007/0143682 A1* | 6/2007 | Kelley et al. | 715/730 |

OTHER PUBLICATIONS

Begole, et al., "Flexible Collaboration Transparency: Supporting Worker Independence in Replicated Application-Sharing Systems", Date: Jun. 1999, pp. 95-132, vol. 6, Issue: 2, ACM Press, NY, USA, http://delivery.acm.org/10.1145/320000/319096/p95-begole.pdf?key1=319096&key2=9365128511&coll=GUIDE&dl=ACM&CFID=11111111&CFTOKEN=2222222.

Kouzes, et al., "Collaboratories: doing science on the Internet", Date: Aug. 1996, vol. 29, Issue: 8, pp. 40-46, IEEE, http://ieeexplore.ieee.org/xpl/freeabs_all.jsp?arnumber=532044.

Rohall, et al., "The Zipper System for Flexible, Replicated Application Sharing", Date: Oct. 23-27, 2005, http://domino.research.ibm.com/cambridge/research.nsf/0/8df3bbbd96965284852570a500603bab/$FILE/TR_2005-08.pdf.

U.S. Official Action dated Jun. 10, 2008 in U.S. Appl. No. 11/218,294.

U.S. Official Action dated Jan. 8, 2009 in U.S. Appl. No. 11/218,294.

U.S. Notice of Allowance / Allowability dated May 20, 2009 in U.S. Appl. No. 11/218,294.

* cited by examiner

```
                                                            ┌─ 300
       interface IAppShareNotification  {
302 ──▶    void appSharingEnabled( );
304 ──▶    void controllerChanged(hostName, UserIdentity);
306 ──▶    void appSharingDisabled( );
       }
```

DocumentLocation RenderRemote(DocumentLocation
    startPoint, graphicsContext, hostname, userIdentity)

DataChanged(startPoint, endPoint, hostname, userIdentity)

DataChanged(startPoint, endPoint)

*FIG. 3D*

PER-USER APPLICATION RENDERING IN THE PRESENCE OF APPLICATION SHARING

CROSS-REFERENCE TO RELATED APPLICATIONS

This application is a Continuation-in-Part of U.S. Pat. No. 7,568,005 entitled "ENHANCED APPLICATION BEHAVIOR IN THE PRESENCE OF APPLICATION SHARING", filed Sep. 1, 2005, the entirety of which is incorporated by reference herein.

BACKGROUND

To remain competitive in a global economy requires efficient and effective communications. For example, manufacturers often have suppliers located across the country and around the world. Timely and effective communications between the manufacturer and supplier can be critical to business success. In other cases, companies often assign business projects to work groups with members physically located around the world. In some situations, the work group members can belong to different organizations and/or companies. As with manufacturers and suppliers, timely and effective communication can be critical to the success of the work group.

Face-to-face meetings have been the traditional method of communicating, but with the organizations becoming increasing geographically dispersed, these meetings often require travel on the part of attendees and, thus, are becoming increasingly time and cost prohibitive. With the proliferation of computers and the advent of the Internet, in particular, these meetings are increasingly taking place virtually over computer networks through the use of electronic communications technologies, such as web meeting/conferencing and application sharing.

Application sharing typically describes a multi-user collaborative environment in which the screen of one user (the "sharer") is captured in realtime and transmitted to the other users. Usually, one remote user at a time can take remote control of the sharer's screen and perform mouse and keyboard actions, for example, while all other users—including the owner of the shared machine—watch passively. One problem with traditional application sharing systems is that non-controlling observers cannot look at other parts of the shared application. For example, if the application being shared is a word processing application, and the application is currently controlled by a user to look at a second page of a document, another user of the shared environment cannot "peek" back at the first page without taking control and scrolling the shared view of the document. If the user attempts this, then all other users are relegated to passively watching this activity.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

This disclosed innovation describes a mechanism that allows users in an application sharing environment to separately view portions of data that are not part of the current shared view (or instance). In one example, a single page (of a multi-page document) being shared and viewed among multiple collaboration users is associated with the other pages such that one user can view a page that is different than the page currently in shared view.

An enhanced application sharing component is provided that facilitates rendering the application data multiple times for a correspondingly similar number of simultaneous users, and sending the additional renderings to the other users for interaction. Each user client includes an application-sharing viewer that composites these per-user renderings onto the base shared image of the user client to create a per-user view of the shared document.

Remote users (also referred to "viewer users" or "viewers") of the shared instance can be given a set of view controls (e.g., a scroll buttons, scrollbars, or similar navigation mechanisms) that can be used to request to look at a different portions of the shared application data. When a remote user issues one or more of these commands, the client application sharing program transmits these commands to the enhanced application on the sharer machine that is doing the sharing. The enhanced sharer component then renders the portion of the data (or document) that is requested by the remote user, but instead of displaying the rendered view on the shared screen, packages the rendered view as a bitmap, for example, and passes the bitmap to the application-sharing program. The sharer application sharing program then transmits the bitmap back to the remote user that issued the command. A bitmap is just one of many different types of drawing commands that can be used. Alternatively, or in combination therewith, other forms of higher-level drawing commands can also be employed.

The bitmap can be accompanied by coordinate information that indicates where on the shared screen of the requesting remote client the bitmap should be overlayed to produce a seamless experience. When the remote user client receives this bitmap, the remote client uses the coordinate information to render the bitmap on top of some or all of the shared view, providing a personalized version of the shared view. Thus, one remote user can look at one page of the document while one or more of the other remote users are looking at the second page.

The enhanced application component facilitates remembering which remote users have requested which portions of the shared document to view, in case the underlying document changes, wherein the enhanced application can re-render that portion of the document and re-transmit the associated bitmaps.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

BRIEF DESCRIPTION OF THE DRAWINGS

FIG. 3A illustrates exemplary code for an API suitable for providing enhanced application behavior in the presence of application sharing.

FIG. 3B illustrates exemplary code for enhancing or supplementing the API of FIG. 3A by which the sharing system can request rendering of other data and include the identity of the requester.

FIG. 3C illustrates an exemplary API for indicating the previously-rendered data is invalid.

FIG. 3D illustrates an alternative API that moves tracking responsibility into the application sharing system.

DETAILED DESCRIPTION

Figure 1:
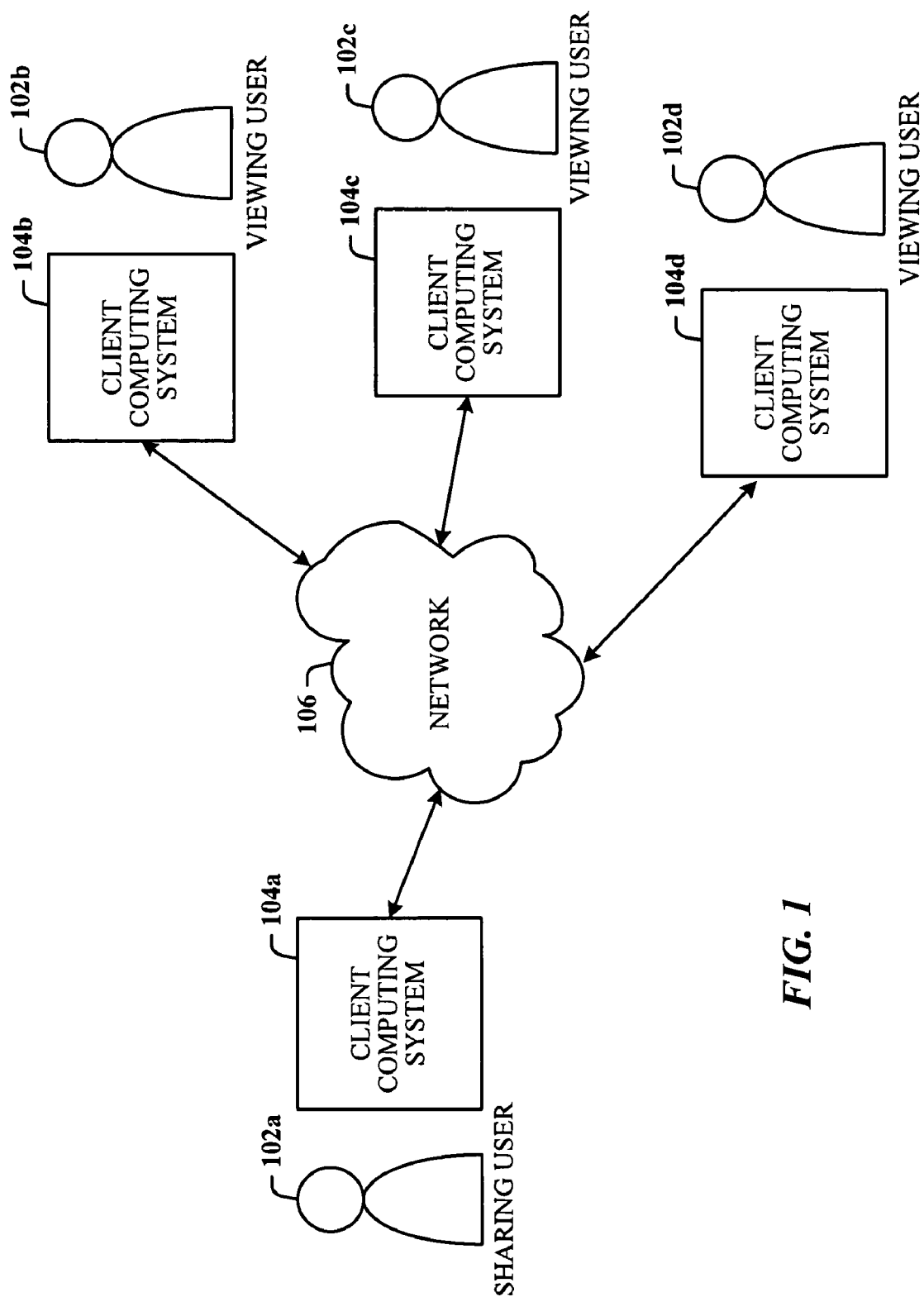
FIG. 1 illustrates is a high-level block diagram showing an environment in which an application sharing aware application can operate.

This disclosed architecture is a mechanism for enhancing an application for sharing data for viewing by other users, whereby data associated with, but not part of, the currently shared view can be rendered on a per-user basis. In other words, according to one example where a user is sharing a page of a document for viewing by remote users, one or more of the remote users can then take a "peek" at page(s) different than the shared page originally passed for shared viewing by the sharing user.

An application enhancement component is provided that facilitates rendering the application data multiple times for a correspondingly similar number of simultaneous users, and sending the additional renderings to the other users for interaction. Each user client can include an application sharing component that composites these per-user renderings onto the base shared image of the user client to create a per-user view of the shared document.

Following is a brief description of a general mechanism for providing enhanced application behavior in the presence of application sharing. In some embodiments, an application program interface (API) allows an application being shared (also referred to as the shared instance) in a collaborative environment to be aware of its application sharing status. An application that is aware of its application sharing status is able to adjust its behavior when being shared. An application developer can incorporate the API into an existing application program to provide the sharing awareness and functionality described herein. Thus, when an instance of the application is executing, an application sharing host, such as, by way of example, an application sharing tool, can use the API to notify the application when in a sharing mode. In addition, the application sharing host can also use the API to provide the shared instance the identity of a user that is currently in control. In this manner, the API allows the application to become application-sharing aware.

In some embodiments, an instance of the application can respond to application sharing notifications by adjusting its operating behavior. For example, the shared instance can display an indication that informs the viewer that the application is currently being shared. The indication can be displayed in a user interface provided by the shared instance such as, for example, a status area or title bar.

In some embodiments, the shared instance can display an indicator that indicates the identity of the user (e.g., user name, client identity, machine name) that is currently in control of the shared instance. The identity of the user can be displayed in an area of the user interface, such as the status area or title bar of the shared instance.

In some embodiments, the instance of the application being shared can adjust its operating behavior by applying policies such as, for example, access control policies, security policies, profiles, etc., according to the identity of the user that is controlling the shared instance. The applied policies can depend on the type of application. Stated another way, the policies can vary from one application program to another application program, depending on the type of application program and the functionality provided by the application program.

For example, where the application is a word processing application, the shared instance can allow read-only, annotate-only, or full-edit access to a document based on the identity of the controlling user, where read-only access does not allow edits to be performed to the document. The controlling user can browse the document and direct other viewing users' attention to a part of the document, but cannot change the document. Annotate-only access allows the controlling user to add comments to the document or edit their own comments, but the controlling user cannot edit the main text of the document or change other users' comments. Full-edit access allows the controlling user to perform all actions including editing the document.

Other policies can include print/no print, read, write, execute, etc. Policies can also specify application settings such as, for example, font size, screen size, keyboard locale (e.g., character set), screen color, screen depth, etc.

In some embodiments, the instance of the application being shared can adjust its operating behavior by associating an action performed by the application program instance with the identity of the user that is controlling the shared instance. In the example of the word processing application, edits made to a document can be properly tagged or annotated with the identity of the user that was controlling the shared instance when the edits were made. The edits made to the document can be assigned different colors, for example, based on the identity of the user controlling the shared instance when the edits were made. For example, changes in, or sections of, the document can appear in different colors. In another example, a result of an action performed in the shared instance, for example, the creation of a new document, a printout of a document, etc., can be attributed to the user that is controlling the shared instance.

In some embodiments, the shared instance can adjust its operating behavior by changing the user interface response to received input. For example, when a user takes control of an instance of an application, the key bindings for the instance of the application can change to match the preferences of the current controller of the application instance.

The innovation is now described with reference to the drawings, wherein like reference numerals are used to refer to like elements throughout. In the following description, for purposes of explanation, numerous specific details are set forth in order to provide a thorough understanding thereof. It can be evident, however, that the innovation can be practiced without these specific details. In other instances, well-known structures and devices are shown in block diagram form in order to facilitate a description thereof.

FIG. 1 illustrates is a high-level block diagram showing an environment in which an application-sharing aware application can operate. The environment illustrates an example application sharing session and comprises a plurality of users 102a-d and a plurality of client computing systems 104a-d each coupled to a network 106. As depicted, user 102a is a sharing user and is using client computing system 104a, and users 102b-d are each viewing users using client computing systems 104b-d, respectively. As such, client computing system 104a can be referred to as a sharer computer, and client computing systems 104b-d can each be referred to as a viewer computer.

The illustrated environment is only one example of a suitable application sharing session involving an application-sharing aware application, and is not intended to suggest any limitation as to the scope of use or functionality of the described techniques. For example, the number of viewing users and viewer computers are provided only for simplicity and one skilled in the art will appreciate that there can be a different number of viewing users and viewer computers in the application sharing session. As used herein, the terms "connected," "coupled," or any variant thereof, is intended to mean any connection or coupling, either direct or indirect, between two or more elements. The coupling of the connection between the elements can be physical, logical, or a combination thereof.

In general terms, the sharing user 102a executes an application sharing program (or other suitable collaboration program that provides application sharing functionality) on the sharer computer 104a and initiates an application sharing session with one or more participants, such as the viewing users 102b-d. Each viewing user also executes a compatible application sharing program or other compatible collaboration program, on the respective viewer computer in order to participate in the application sharing session.

During the application sharing session, the sharing user 102a can invoke an instance of an application program on the sharer computer 104a, such as a word processing program, that is application-sharing aware, and designate the instance of the application program to be shared with the other participants in the application sharing session. This causes the application sharing program executing on the sharer computer 104a to share the output generated by the instance of the application program being shared on the sharer computer 104a with the viewer computers 104b-d. Upon sharing the instance of the application program, the application sharing program on the sharing computer 104a can use an API supported by the application program to inform the instance of the application program that it is being shared.

While sharing the instance of the application program on the sharer computer 104a, the sharing user 102a can pass control of the instance of the application program being shared to a viewing user (e.g., 102b, 102c, 102d). When control of the instance of the application program being shared is passed to a viewing user, the application sharing program on the sharer computer 104a can use the API to inform the instance of the application program being shared of the identity of the viewing user that currently has control. When control is passed to a viewing user, the application sharing program executing on the viewing user's computer communicates the control inputs (e.g., the inputs made by the viewing user having control of the instance of the application program being shared) to the application sharing program executing on the sharer computer 104a, which then communicates the received control inputs to the instance of the application program being shared.

The instance of the application program being shared can then process the received control inputs based upon the identity of the viewing user that made or issued the control inputs. For example, the instance of the application program being shared can adjust its operating behavior based on the identity of the viewing user that made the control inputs. When the actions associated with the control inputs are executed, the application sharing program executing on the sharer computer 104a shares the results of the executed actions (e.g., the resulting display generated by the application program being shared) back out to the viewer computers (104b-d), including the viewer computer being used by the viewing user who has control of the instance of the application program being shared.

Subsequently, when the sharing user resumes control of the instance of the application program being shared, or passes control to another viewing user, the application sharing program on the sharer computer 104a can use the API to inform the instance of the application program being shared the identity of the user that has control. The instance of the application program being shared can then adjust its operating behavior based on the identity of the new controlling user.

In general terms, the network 106 can be a communications link that facilitates the transfer of electronic content. In one embodiment, the network 106 includes the Internet. It will be appreciated that the network 106 can comprise one or more other types of networks, such as a local area network, a wide area network, a point-to-point dial-up connection, and the like.

The computing systems 104a-d will now be described, generally; however, a description with greater specificity is provided infra with respect to FIG. 17. The computing systems such as the sharer computer and the viewer computer, can include one or more central processing units, memory, input devices (e.g., keyboard and pointing devices), output devices (e.g., display devices), and storage devices (e.g., disk drives). The memory and storage devices are computer-readable media that can contain instructions that implement the various techniques for providing enhanced application behavior in the presence of application sharing, described herein. In addition, the data structures and message structures can be stored or transmitted via a data transmission medium, such as a signal on a communications link. Various communication links can be used, such as the Internet, a local area network, a wide area network, a point-to-point dial-up connection, a cell phone network, and so on. One of ordinary skill in the art will appreciate that the computing systems can be of various configurations having various components.

Embodiments of the described techniques can be implemented in various operating environments that include personal computers, server computers, computing devices, hand-held or laptop devices, multiprocessor systems, microprocessor-based systems, programmable consumer electronics, digital cameras, network PCs, minicomputers, mainframe computers, distributed computing environments that include any of the above systems or devices, and so on. The computing systems can be cell phones, personal digital assistants, smart phones, personal computers, programmable consumer electronics, digital cameras, kiosks, ATMs, and so on.

The various techniques for providing enhanced application behavior in the presence of application sharing can be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules can be combined or distributed as desired in various embodiments.

Figure 2:
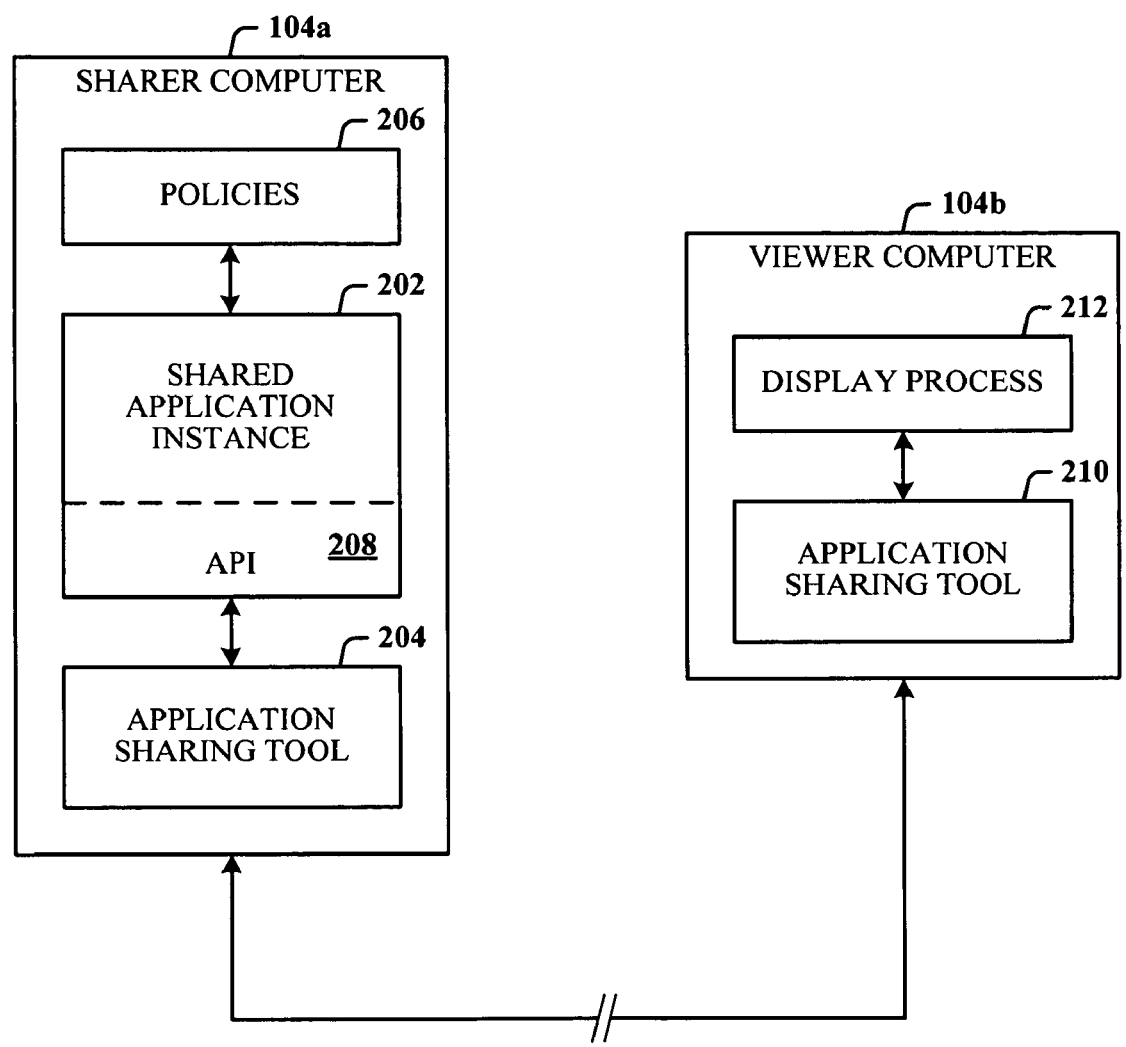
FIG. 2 illustrates a block diagram of selected components of a sharer computer coupled to the viewer computer, according to some embodiments.

FIG. 2 illustrates a block diagram of selected components of the sharer computer 104a coupled to the viewer computer 104b, according to some embodiments. One skilled in the art will appreciate that although only one viewer computer is illustrated in FIG. 2, this is not meant as a limitation to the actual number of viewer computers and that there can be more than one viewer computer in an application sharing session, as illustrated by way of example in FIG. 1. Moreover, even though the sharer computer 104a is illustrated as being coupled to the viewer computer 104b, one skilled in the art will appreciate that the sharer and viewer computers (104a and 104b) can communicate through a collaboration service server computer (not depicted), which can provide collaboration bridge functionality.

As depicted, the sharer computer 104a comprises a shared application instance 202 and an application sharing tool 204, each executing on the sharer computer 104a, and policies 206. The shared application instance 202 provides (e.g., supports) an API 208. The viewer computer 104b comprises an application sharing tool 210 and a display process 212, each of which is executing on the viewer computer 104b. The aforementioned components and processes of the sharer computer 104a and the viewer computer 104b are only illustrative, and one skilled in the art will appreciate that the computers (104a-b) can include other components and processes not depicted.

The shared application instance 202 is an invocation of an application program, such as a word processing application, a drawing or graphics application, presentation application, spreadsheet application, or other well-known interactive applications, from which information (e.g., the output display) is being shared by the application sharing tool 204 with one or more computers, such as the viewer computers. One skilled in the art will appreciate that many shared applications can also be used in a non-shared manner. For example, a word processing application can be used by the sharing user for non-collaborative document production, and can then be used in a shared manner for group editing of the same or another document.

The API 208 allows the shared application instance 202 to be an application instance that is aware of its application sharing status. The API 208 is the component that allows an application program, such as a conventional interactive application program, to become application-sharing aware. The API 208 allows the application sharing tool 204 to communicate application sharing status and other related information to the shared application instance 202. The API 208 is further discussed below.

The application sharing tool 204 provides the application sharing functionality. The application sharing tool 204 can be provided as a component of an application sharing application or as a component of other suitable collaboration applications. The sharing user can invoke an instance of the application sharing tool 204 on the sharer computer 104a to initiate application sharing of the shared application instance 202 with, for example, the viewing user at the viewer computer 104b. In some embodiments, the instance of the application sharing tool 204 on the sharer computer 104a uses the provided API 208 to inform the application instance 202 that it is being shared.

During the application sharing of the shared application instance 202, the instance of the application sharing tool 204 receives information from the shared application instance 202, and sends the received information to the application sharing tool 210 executing on the viewer computer 104b. For example, the sharer application sharing tool 204 can read, in a non-intrusive manner, the information sent by the shared application instance 202 to the sharer computer's screen. On the viewer computer 104b, the instance of the application sharing tool 210 receives the information from the sharer computer 104a, and sends the received information to the display process 212 for displaying on the viewer computer's screen.

In some embodiments, the instance of the application sharing tool 204 on the sharer computer 104a uses the provided API 208 to inform the shared application instance 202 the identity of the application sharing session participant that has control of the shared application instance 202. For example, at the beginning of the application sharing session, the instance of the application sharing tool 204 can use the API 208 to identify the sharing user as the user having control of the shared application instance 202. When the sharing user is in control of the shared application instance 202, the shared application instance 202 can receive control input from one or more input components coupled to the sharer computer 104a, such as, for example, a keyboard, a mouse, etc. Subsequently, if the sharing user passes control of the shared application instance 202 to another user, such as the viewing user, the instance of the application sharing tool 204 on the sharer computer 104a can use the API 208 to identify the viewing user as the user having control of the shared application instance 202.

When the viewing user is in control of the shared application instance 202, the shared application instance 202 can receive control input from the instance of the application sharing tool 204 on the sharer computer 104a. In this instance, the viewing user can provide the control inputs using the input components coupled to the viewer computer 104b, causing the instance of the application sharing tool 210 on the viewer computer 104b to send the control inputs to the instance of the application sharing tool 204 on the sharer computer 104a for processing by the shared application instance 202.

In some embodiments, the policies 206 specify the security levels (e.g., access controls), profiles, rules, etc., that can be implemented by the shared application instance 202. This can be specified at a user-level, group-level, etc., and can provide a policy-based infrastructure for enforcing application execution decisions regarding whether the shared application instance 202 can execute and/or how the shared application instance 202 is to execute.

The policies 206 can be setup by administrators or the sharing user. For example, if multiple users are anticipated to have control of the shared application instance 202, the policies 206 can be specified in such a way that certain users do not have authorization to perform certain functions supported by the shared application instance 202. As another example, the policies 206 can be specified in such a way that the shared application instance 202 executes using different profiles and/or settings based on the identity of the controlling user. Suitable security policies can include, by way of example: a simple policy that the controlling user always gets read-only access; as each user takes control, the application sharing tool 202 can ask a user at the sharing machine (e.g., sharing user) what access to give the new controller of the shared application instance 202; the access can be based on the file system permissions of the file being edited; access can be specified in user preferences for the sharing user, explicitly naming potential controlling users or protection groups; access can be determined by roles in the conferencing system that launched the application sharing session, if any (e.g., MICROSOFT LIVE MEETING can distinguish "presenters" from "attendees," and presenters can be allowed to edit, but attendees are not); and, access can be controlled based on the hosts the controller is coming from (e.g., only users on internal domain-connected machines are allowed to edit).

FIG. 3A illustrates exemplary code for an API 300 suitable for providing enhanced application behavior in the presence of application sharing, according to some embodiments. As depicted, the API 300 comprises three functions or methods 302, 304 and 306 for communicating, or messaging, with an application-sharing aware application program.

In some embodiments, the API 300 can be implemented as a Common Object Model (COM) interface that is exported by the application-sharing aware application. Object-oriented programming techniques, including the development of MICROSOFT'S COM interfaces, as well as other object models that provide a mechanism for communication or messaging, between objects, such as the application-sharing aware program and the application sharing tool, are generally known to those of ordinary skill in the art of object oriented programming. In some embodiments, the API 300 can be implemented as a communication interface using other programming techniques such as compiled program techniques, procedure call techniques, scripting techniques, RPC, etc.

In the example API 300 depicted in FIG. 3A, method 302 is an "appSharingEnabled" method that can be used to notify the application-sharing aware program that it is being shared. Method 304 is a "controllerChanged" method that has two parameters, "hostname" and "userIdentity," and which can be used to inform the application-sharing aware program of the identity of the user controlling the instance of the application-sharing aware program. The "hostname" parameter of the method 304 is used to specify the identity of the host (e.g., the computer) on which the shared instance of the application-sharing aware program is executing. The "useridentity" parameter of the method 304 is used specify the identity of the user that has control of the shared instance of the application-sharing aware program. In some embodiments, the controllerchanged method 304 can not include the hostName parameter or the userIdentity parameter. Method 306 is an "appSharingDisabled" method that can be used to notify the application-sharing aware program that it is no longer being shared.

FIG. 3B illustrates exemplary code 308 for enhancing or supplementing the API 300 of FIG. 3A by which the sharing system can request rendering of other data and include the identity of the requestor. For example, a sample method code 308 could look like the following:

DocumentLocation RenderRemote(DocumentLocation startPoint, graphicscontext, hostname, userIdentity).

The return value is the ending point of the data that fit in the viewable area described by the graphics context.

FIG. 3C illustrates an exemplary API 310 for indicating the previously-rendered data is invalid. The sharing system can provide the API 310 to allow the application-sharing aware application to tell the sharing system that previously rendered data is now invalid. This can be in a separate interface, since the calls are going in the opposite direction. The interface can be exemplified as the following:

DataChanged(startPoint, endPoint, hostname, userIdentity)

This can be a hint to the remote viewing application that a request for another rendering of the data should be made, if it is still trying to be presented to the user.

FIG. 3D illustrates an alternative API 312 that moves tracking responsibility into the application sharing system. An alternative could be to have the following API 312:

DataChanged(startPoint, endPoint), which moves the responsibility for tracking the entity that potentially cares about a change into the application sharing system.

Figure 4:
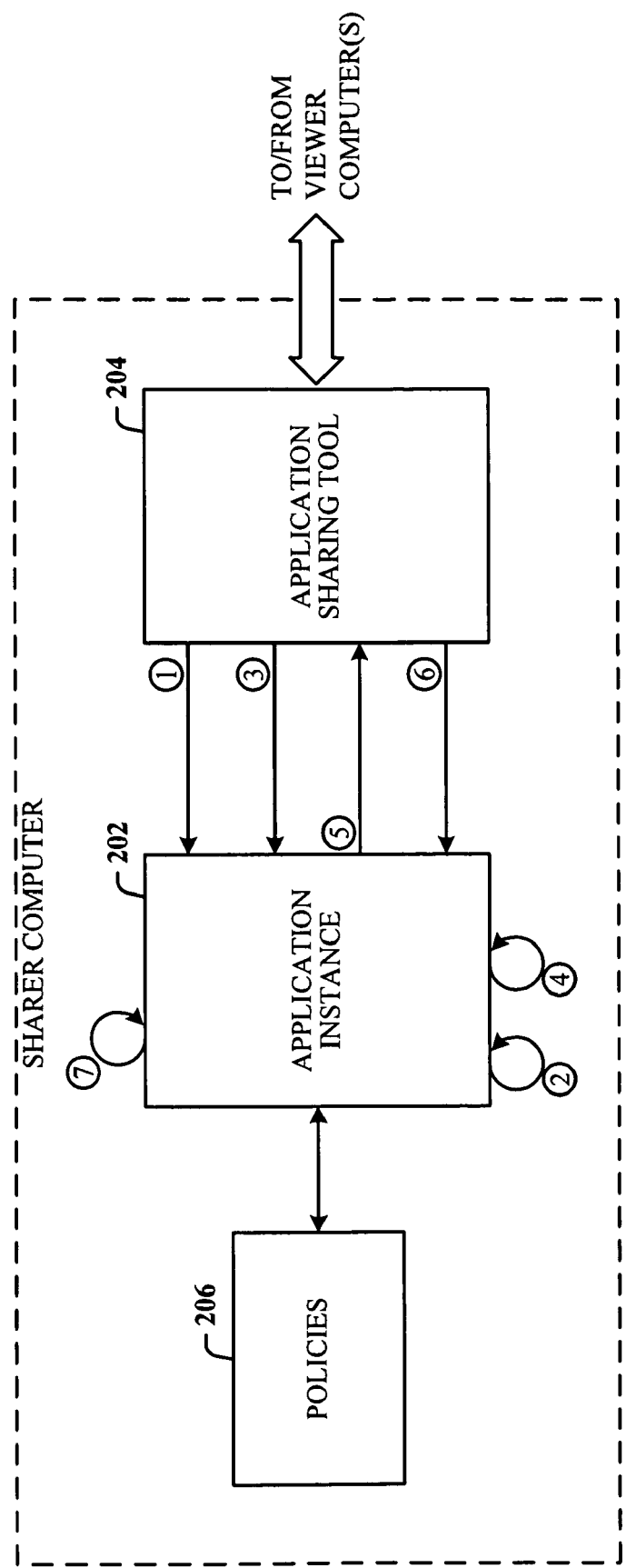
FIG. 4 illustrates a flow diagram of information between the application sharing tool and the shared instance of an application sharing aware application.

FIG. 4 illustrates a flow diagram of information between the application sharing tool 204 and the shared instance 202 of an application-sharing aware application, according to some embodiments. Flow is described in the context of the application instance being associated with a word processing application. However, it is to be understood that the application instance 202 can be many other types of applications (e.g., spreadsheet). By way of example, the sharing user can be sharing an instance of a word processing application with one or more viewing users to develop a project plan document. During the application sharing session, the sharing user can have granted a viewing user control of the word processing application instance 202 that is being shared. Upon passing control to the viewing user, the application sharing tool 204 provides the word processing application instance 202 the identity of the user that has control of the word processing application instance 202 (stage 1).

Upon receiving the identity of the user that has control, the word processing application instance 202 sets up for control by the indicated user (stage 2). For example, the word processing application can apply the policies 206 that are appropriate for the viewing user that is identified as having control of the word processing application instance 202. While the viewing user has control of the word processing application, the application sharing tool 204 receives input controls from the viewing user's computer and forwards the received input controls to the word processing application instance 202 (stage 3). The word processing application instance 202 executes the received input controls made by the viewing user (stage 4).

In some embodiments, the word processing application instance 202 can perform access control checks to ensure that the viewing user is authorized to perform the actions caused by the input controls. In some embodiments, the word processing application instance 202 attributes the results of the actions caused by the input controls to the sharing user. For example, if one of the input controls was an edit to a section of the document, the word processing application instance 202 can identify the sharing user as the owner of the resulting edit to the document.

Upon executing an input control, the word processing application instance 202 sends the results of executing the input control to the application sharing tool 204 (stage 5). The application sharing tool 204 then sends the results to the other viewer computers that are participating in the application sharing session. Subsequently, the sharing user can transfer control of the word processing application instance 202 to another participant in the application sharing session. Upon allowing another participant to control the word processing application instance 202 (e.g., when a different user becomes the controller of the word processing application instance 202), the application sharing tool 204 provides the word processing application instance 202 the identity of the new user that has control of the word processing application instance 202 (stage 6). Upon receiving the identity of the new user that has control, the word processing application instance 202 sets up for control by the indicated new user (stage 7).

The enhanced application capabilities described herein can also facilitate data rendering in the remote clients (e.g., a viewer computer 104b of FIG. 1) of different data associated with the shared data currently being viewed at the sharing client (e.g., the sharer computer 104a of FIG. 1) using one or more of the shared application instance 202, application sharing tool 204, policies 206, and/or API 208 of FIG. 2.

Figure 5:
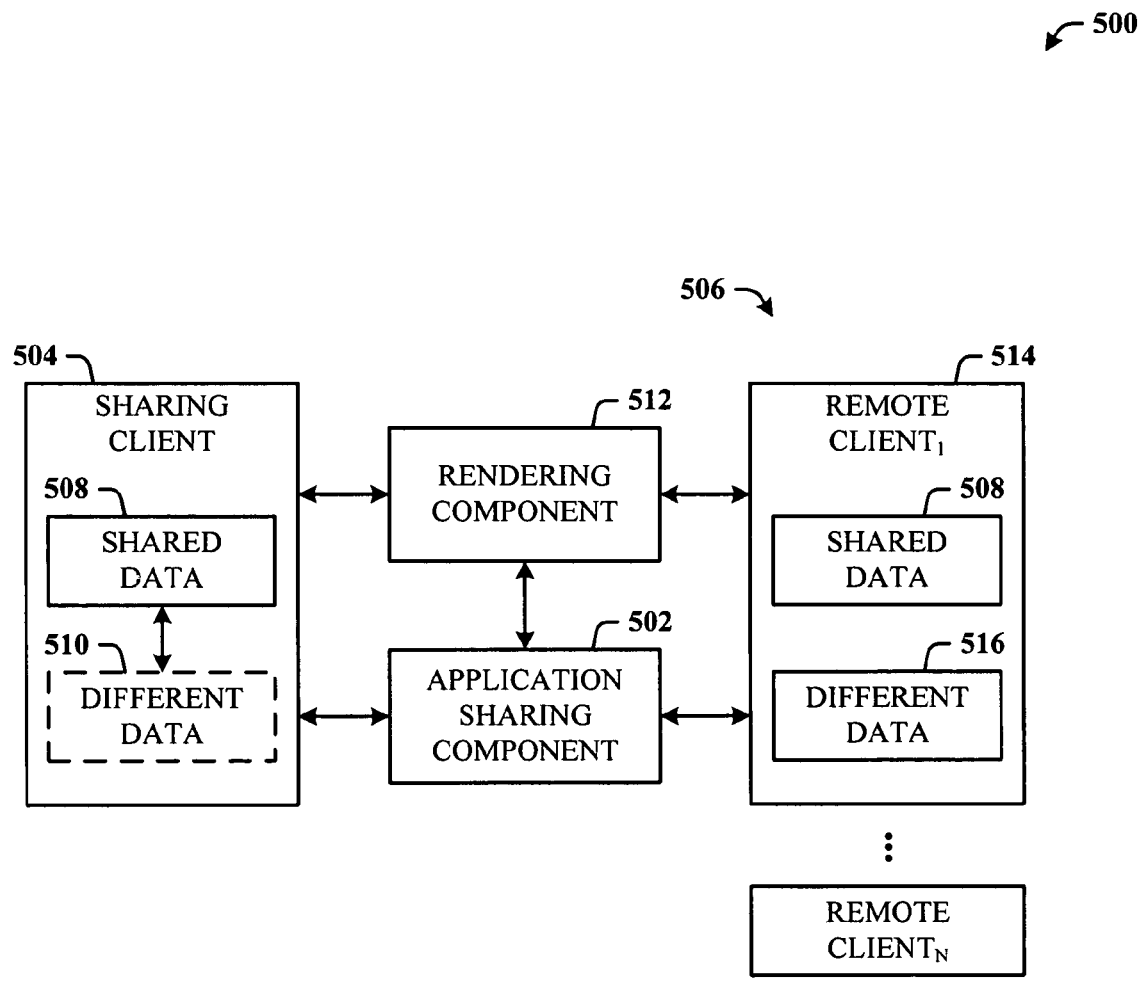
FIG. 5 illustrates a system that facilitates application management in accordance with the innovation for the rendering of different data associated with the shared data.

FIG. 5 illustrates a system 500 that facilitates application management in accordance with the innovation for the rendering of different data associated with the shared data at a remote client. The system 500 includes an application sharing component 502 in support of application sharing between a sharing client 504 and one or more remote clients 506 (denoted REMOTE CLIENT$_1$, . . . , REMOTE CLIENT$_N$, where N is a positive integer). For example, the application sharing component 502 facilitates the presentation of shared data 508 of the sharing client 504 on the remote clients 506 via a shared application. In other words, the clients (504 and 506) can include a program that allows for sharing and viewing of the shared program data 508 during a sharing (or collaborative) session.

The shared data 508 of the sharing client 504 can include (or be associated with) other data (also referred to as different data 510) that is not viewable at the time the shared data 508 is being viewed at the sharing client 504 and the remote clients 506. The use of the term "different" is intended to mean data that is not currently being viewed, but includes all data associated with a viewing instance. In other words, in a multi-page document, the pages other than the page(s) currently being viewed, are referred to as different data, in that it is different than the shared data currently being viewed, yet associated with (or related to) the shared data. The non-viewability or non-rendering of the different data 508 at the sharing client 504 is represented with a dashed line box, indicating that it is currently not being viewed at the sharing client 504, and hence, not being shared with the remote clients 506.

The system 500 can also include a rendering component 512 for rendering the different data 510 of the sharing client 504 on at least one of the remote clients 506 (e.g., a first remote client 514) via the shared application. In accordance with an innovative aspect, the different data 510 associated with the shared data 508 can be rendered on the first remote client 514 as client difference data 516 while the sharing data 508 is being presented on the sharing client 504. This can also mean that the client difference data 516 can be rendered on the first remote client 514 while the shared data 508 is being presented on the first remote client 514. In other words, the user of the first remote client 514 can now view data associated with the shared data 508, separately or in combination with the shared data 508. For example, if the shared data 508 is a multi-page document, and the first page of the document is being shared as the shared data 508, the remote client user can then navigate to a second page that is not currently being viewed, and view the second page.

Note that the application sharing component 502 and the rendering component 512 are depicted as central entities to the clients (504 and 514). This can be the case in a server-based system where the clients (504 and 514) are thin clients of limited processing and rendering capability and a server (not shown) provides the enhanced application sharing and rendering capabilities described herein. However, it is more likely the case that each of the clients (504 and 506) includes an implementation of the application sharing component 502 and the rendering component 512 for enhanced application sharing and rendering. Accordingly, the sharing client 504 will include a suitable implementation of the application sharing component 502 and the rendering component 512, as will each of the clients 506.

It is further to be appreciated that the clients (504 and 506) can range from full capability workstation (or desktop) computing systems to handheld portable devices (e.g., cell phone, PDA) with less or limited rendering and/or sharing capability. The system 500 is suitably robust to address and account for all ranges of client system capabilities.

Other capabilities for enhanced client viewing will be described herein related to, for example, remote client control of a sharing session, switching between shared view and alternative views at the remote client, providing navigation tools for the remote client, identifying remote client capabilities, announcing client capabilities, buffering and caching data, formatting different data for transmission to the remote client(s), and so on.

Figure 6:
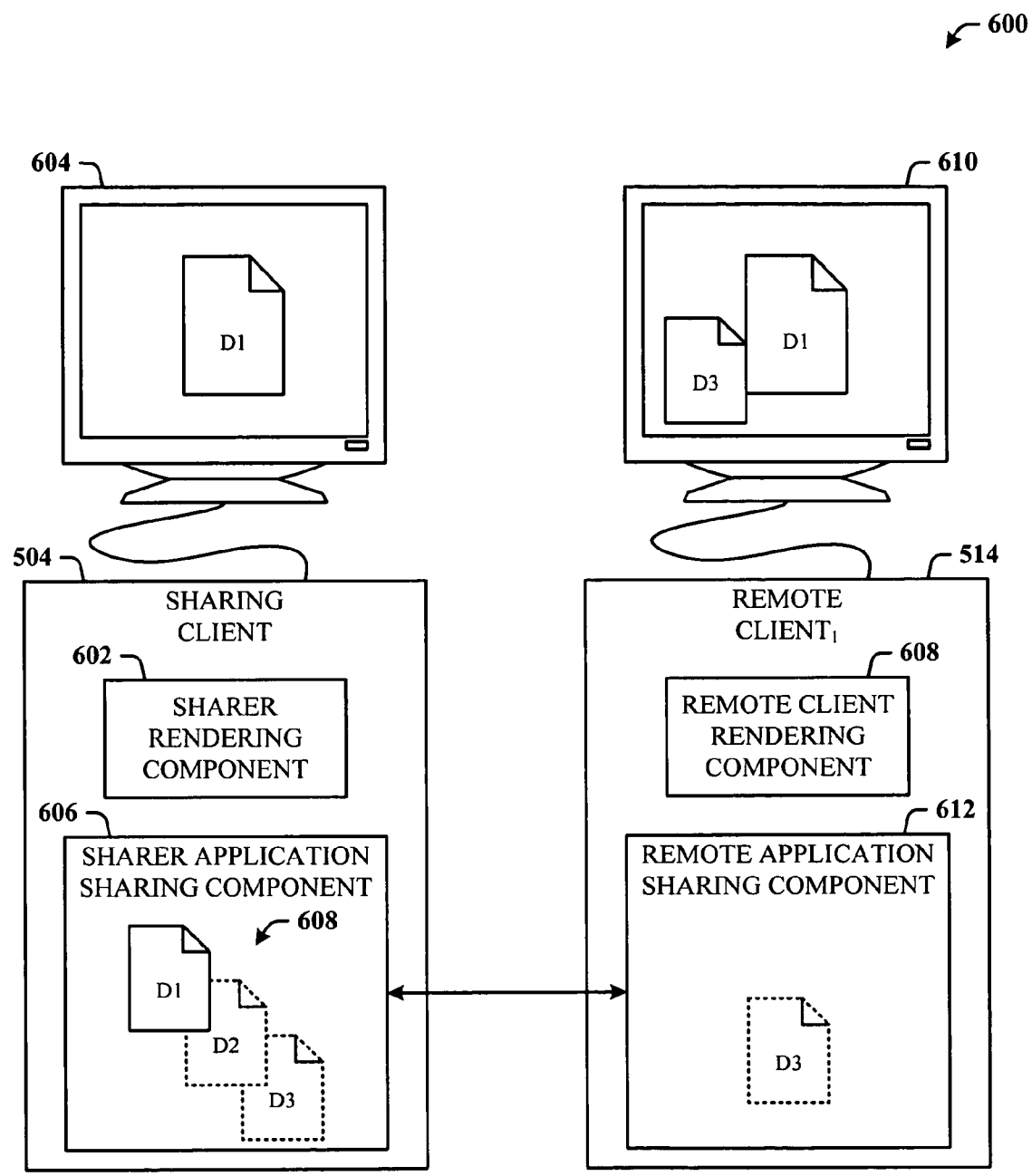
FIG. 6 illustrates an alternative system for remote client rendering and control of shared data and associated different data.

FIG. 6 illustrates an alternative system 600 for remote client rendering and control of shared data and associated different data. Here, the sharing client 504 and remote client 514 each include a rendering component. It should be understood that the rendering component is independent of the specifics of the application-sharing aware application. In other words, it is not a requirement that modifications to application (e.g., a spreadsheet) on the sharer client 504 also need to be made to code that runs at the remote client side. As illustrated, the sharing client 504 includes a sharer rendering component 602 for rendering information to a sharing client display 604. In support thereof, the sharing client 504 includes a sharer application sharing component 606 for sharing a shared document (denoted D1), of a plurality of documents 608 (e.g., a multi-page document).

Similarly, the remote client 514 can include a remote client rendering component 608 for rendering information to a remote client display 610. In support thereof, the remote client 514 includes a remote application sharing component 612 for receiving the shared document D1. The shared document D1 is then rendered to the remote client display 610.

Additionally, in accordance with the disclosed architecture, the remote client 514 can request rendering of one or more of the other documents (D2, D3) of the plurality of documents 608 (the documents D2 and D3 denoted with dotted borders to indicate currently not in shared view during the session). This is facilitated by the sharer application sharing component 606 making the remote application sharing component 612 aware of the availability of the other different (and currently, unviewed) documents D2 and D3. Accordingly, the user of the remote client 514 can cause to be transmitted from the remote client 514 to the sharing client 504 a request (or command) for rendering at the remote client 514 one or more of the different documents D2 and/or D3. Here, the remote client 514 renders different data in the form of the document D3, as requested by the remote client user. Thus, the document D3 can be presented on the remote client display 610 separately or in combination with the shared document D1 (the document D3 now shown with solid line borders to indicate in view by the remote client user). Where multiple remote clients are part of the sharing session, each of the corresponding remote client users can request and view the different documents (D2 or D3) separately on a per-user basis.

As indicated hereinabove, the application sharing components (606 and 612) include the following capabilities: the application under sharing is aware it is being shared, the application being shared is made aware of the identities of the remote users in the sharing session, and the application being shared is aware of the identity of the current remote client user who is remote controlling at any given time and receives notification when the controlling identity changes. The application also renders a portion of the shared content (or data) to the screen at any given time, and provides a way to change which portion is being rendered, through navigation tools (e.g., scrollbars, a previous page/next page control, or some similar mechanisms).

As described herein, remote client users can be presented with a set of view navigation controls that they can use to request to look at a different portion of the shared application. When a remote user interacts with the interface to cause activation of one or more commands associated with the navigation controls, the remote application sharing component 612 transmits the one or more commands to the enhanced application (e.g., included as part of the sharer application sharing component 606) of the sharing client 504. The portion (document D2 and/or D3) of the document D1 associated with the one or more commands (or requests) from the remote client 514 is rendered by the sharer rendering component 602 for transmission to the remote client 514.

However, rather than displaying the rendered portion on the sharing client display 604 as part of the shared data D1, the sharing client 504 packages the rendered portion as a binary representation (e.g., bitmap data), and transmits the binary representation to the sharer application sharing component 606, which then transmits the packaged portion to the remote client 514 that issued the command(s). The remote application sharing component 612 receives and passes the bitmap data to the remote client rendering component 608 for rendering and display on the remote client display 610 as document D3. When bitmap data, the bitmap data can also be accompanied by coordinate information that indicates where, on the shared screen of the remote client display 610, the bitmap data (of document D3) will be displayed.

In one implementation, the bitmap data is presented as an overlay to part of the shared document D1 of the remote client display 610 to produce a seamless user experience. In other words, when the remote client 514 receives the bitmap data, the coordinate information is processed by the remote client rendering component 608 to render the bitmap data over all or part of the shared view document D1, thereby providing a personalized version of the shared view. According to one example, one remote client user could request and be presented with page two of a multi-page document, while the rest of the other remote client users are looking at the shared data of the first page.

The enhanced application, as part of the sharer application sharing component 606, for example, can remember which of the remote clients (e.g., remote client 514) have made requests for different data (D2 and/or D3), and more specifically, which portions of the different data associated with the shared document D1 to view. Thus, if the underlying or shared document D1 changes (e.g., by editing), the enhanced application of the sharing client 504 can re-render that portion of the document D1 and re-transmit the different data portion as a bitmap to the requesting remote client(s).

Applications that are enhanced for alternative data viewing (or viewing of the different data) at the remote clients can announce this capability to the sharing client 504. Thus, the sharer application sharing component 606 can inform the remote clients (and users) that enhanced navigation capabilities (e.g., pan, zoom, and scroll of the enhanced application independently of the shared view) are available. Non-enhanced applications can be shared at the same time, but not support the novel enhanced per-user rendering behavior described herein.

The sharer application sharing program of the sharing client component 608 can be configured to offer additional commands to remote client viewers (or user interfaces). For example, one command presented and which can be invoked by the remote client 514 changes the shared view across all clients (sharing and remote) to be identical to the view that the invoking viewer currently sees. For example, if the remote client users currently perceive shared view document D1 and different data document D3, the other clients will then be automatically presented with the same view of the documents D1 and D3.

Another command that can be provided resets the invoking remote client viewer's viewing coordinates to the original shared view so that the remote client viewer is again looking at the same rendering of the shared view of the application as the other clients. The wording for these commands as viewed can be, for example, "Show everyone what I'm seeing" and "Show me what everyone else is seeing". Remote client users can still request remote control, thereby becoming the sharing client, and using remote control to change a portion of the document that is actually rendered to the sharing client display 604.

Bitmaps are just one of many different types of drawing commands that can be used. Alternatively, or in combination therewith, other forms of higher-level drawing commands can also be employed.

FIGS. 7-15 illustrate methodologies of performing one or more processes associated with the novel sharing and rendering architecture. While, for purposes of simplicity of explanation, the one or more methodologies shown herein, for example, in the form of a flow chart or flow diagram, are shown and described as a series of acts, it is to be understood and appreciated that the subject innovation is not limited by the order of acts, as some acts can, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with the innovation.

Figure 7:
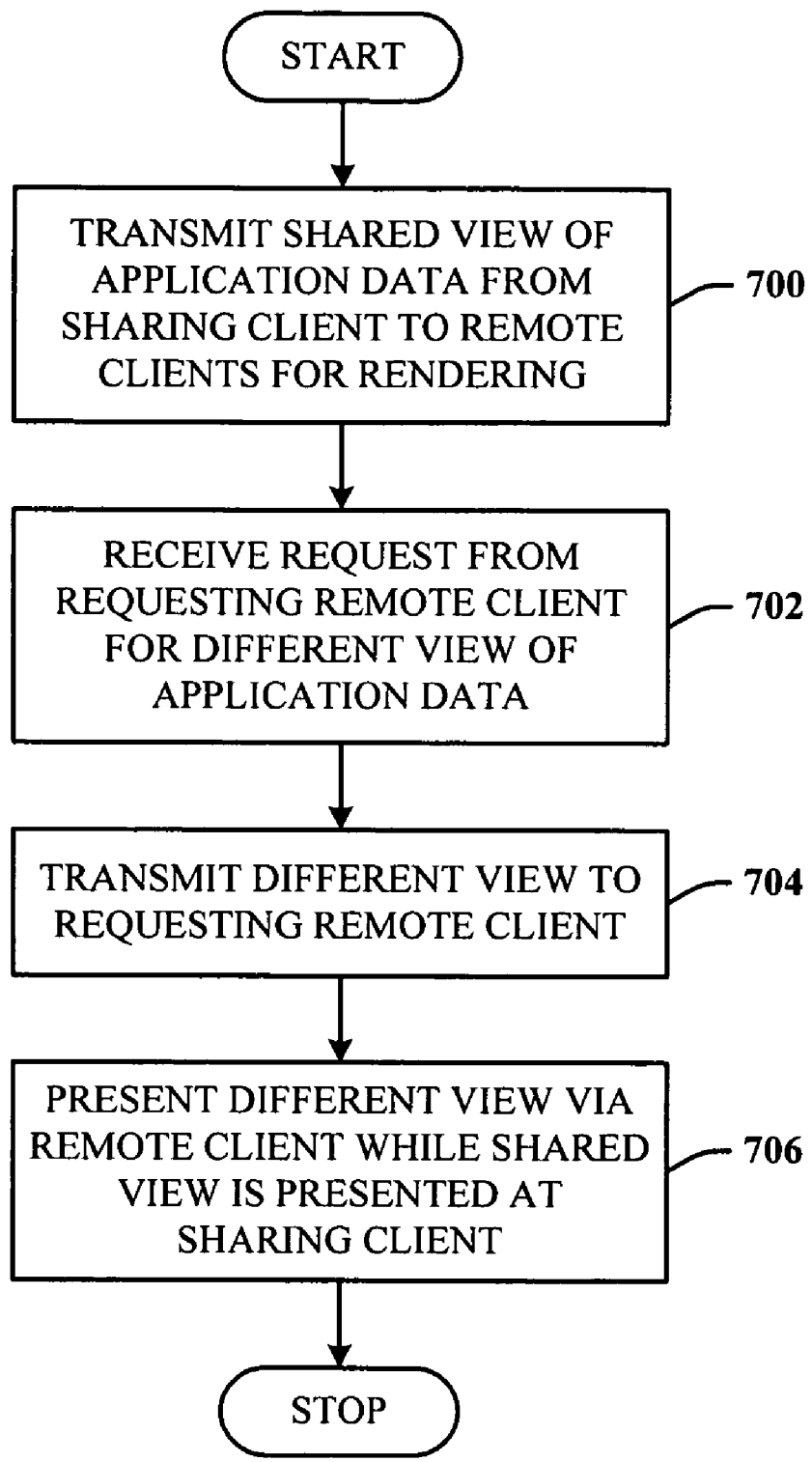
FIG. 7 illustrates a methodology of managing an application.

FIG. 7 illustrates a methodology of managing an application. At 700, a shared view of application data is transmitted from a sharing client to remote clients for rendering of the shared view at the remote clients via a remote client application. At 702, a request is received from a requesting remote client for a different view of the application data. At 704, the different view of the application data is transmitted to the requesting remote client. At 706, the different view of the application data is presented via the remote client application while the shared view is being presented at the sharing client.

Figure 8:
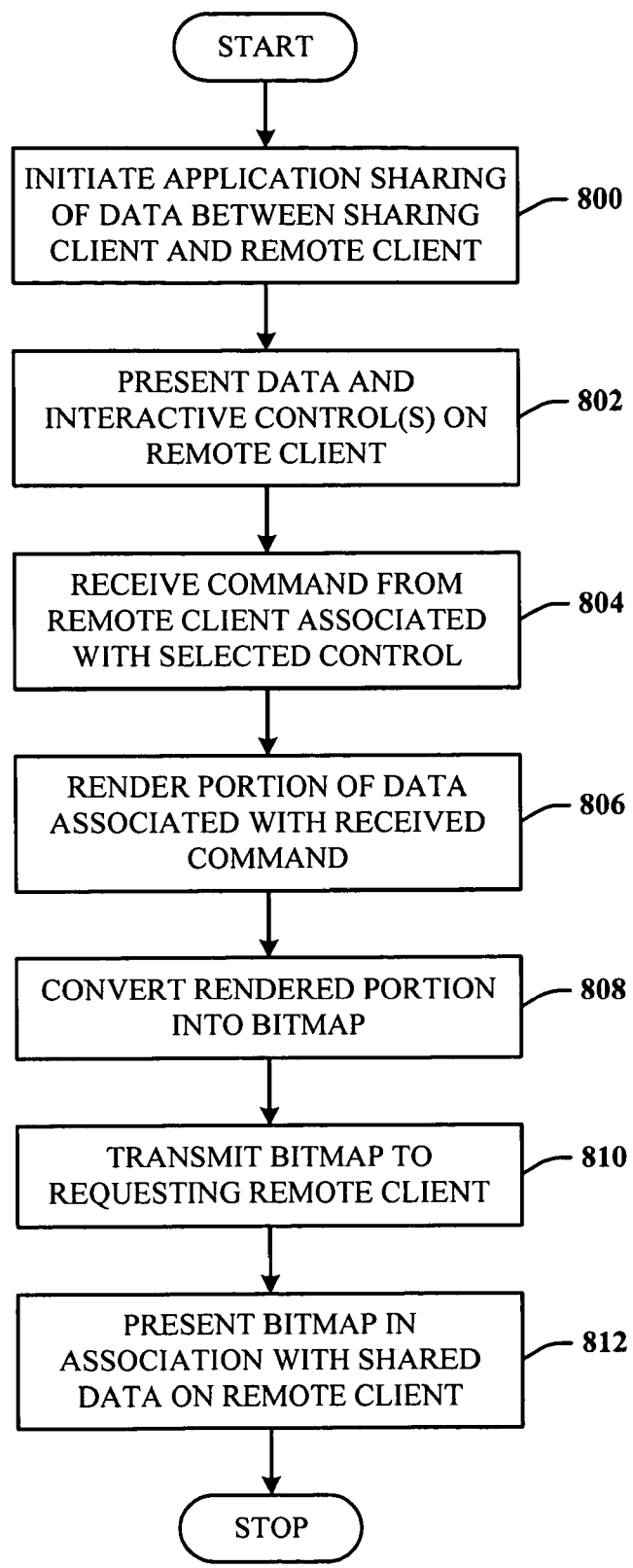
FIG. 8 illustrates a methodology of rendering different data for a remote client.

FIG. 8 illustrates a methodology of rendering different data than the shared data for a remote client. At 800, application sharing of data is initiated between a sharing client and a remote client. At 802, shared data and enhanced controls are presented on a remote sharing client. At 804, the sharing client receives a command (or request) from a remote client associated with selection of a control by the client user. At 806, a portion of the data associated with the shared data, as requested by the command, is rendered by the sharing client. At 808, rather than presenting the data portion as part of the shared view for all clients, the data portion is rendered by the sharing client as bitmap data. At 810, the bitmap data is transmitted to the requesting remote client. At 812, the bitmap data is presented on the remote client in association with the shared view data.

Figure 9:
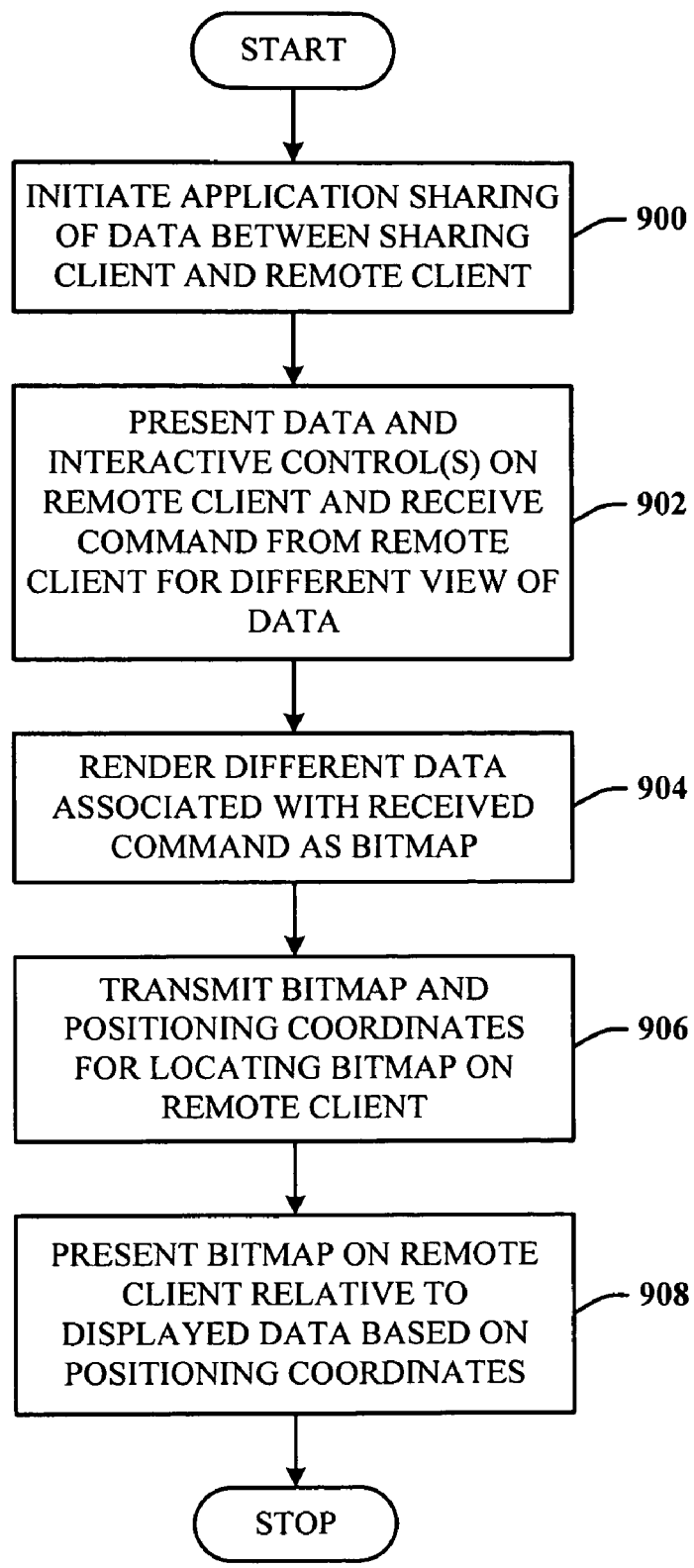
FIG. 9 illustrates a methodology of positioning the bitmap data portion selected by the remote client user.

FIG. 9 illustrates a methodology of positioning the bitmap data portion selected by the remote client user. At 900, application sharing of data is initiated between a sharing client and a remote client. At 902, shared data and enhanced controls are presented on a remote sharing client, and the sharing client receives a command from the remote client for a different view of the shared data. At 904, the different data associated with the received command is rendered as bitmap data. At 906, the bitmap data and positioning coordinate data (e.g., a coordinate system based on a floating point value from 0.0-1.0) for positioning the bitmap data on the remote client display are transmitted to the requesting remote client. At 908, the bitmap data is positioned and presented on the remote client display relative to the shared data based on the positioning coordinates.

Figure 10:
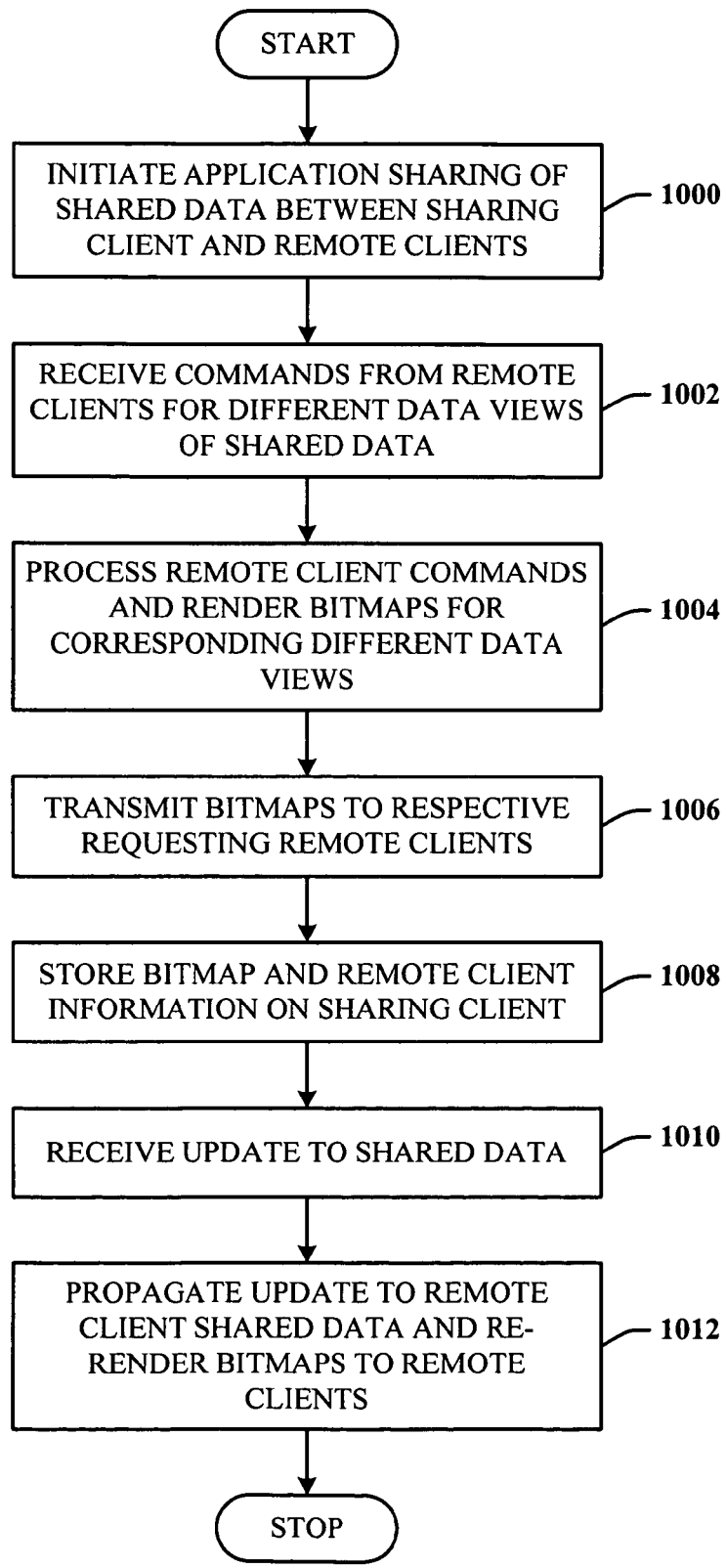
FIG. 10 illustrates a methodology of processing updates to underlying data to the clients.

FIG. 10 illustrates a methodology of processing updates to underlying data to the clients. At 1000, application sharing of data is initiated between a sharing client and a remote client. At 1002, shared data and enhanced controls are presented on a remote sharing client, and commands are received from the remote clients for different data views of the shared data. At 1004, remote client commands are processed and associated bitmap data rendered for the corresponding different data views. At 1006, the bitmap data is transmitted to the corresponding requesting remote clients. At 1008, bitmap and remote client information is stored on the sharing client. Note that the bitmap and remote client information can be stored elsewhere for access by the sharing client. At 1010, updates are made to the shared data. At 1012, the updates are propagated to the shared data of the remote clients, and the associated bitmap data is re-rendered and sent to the respective remote clients for presentation with the updated shared data.

Figure 11:
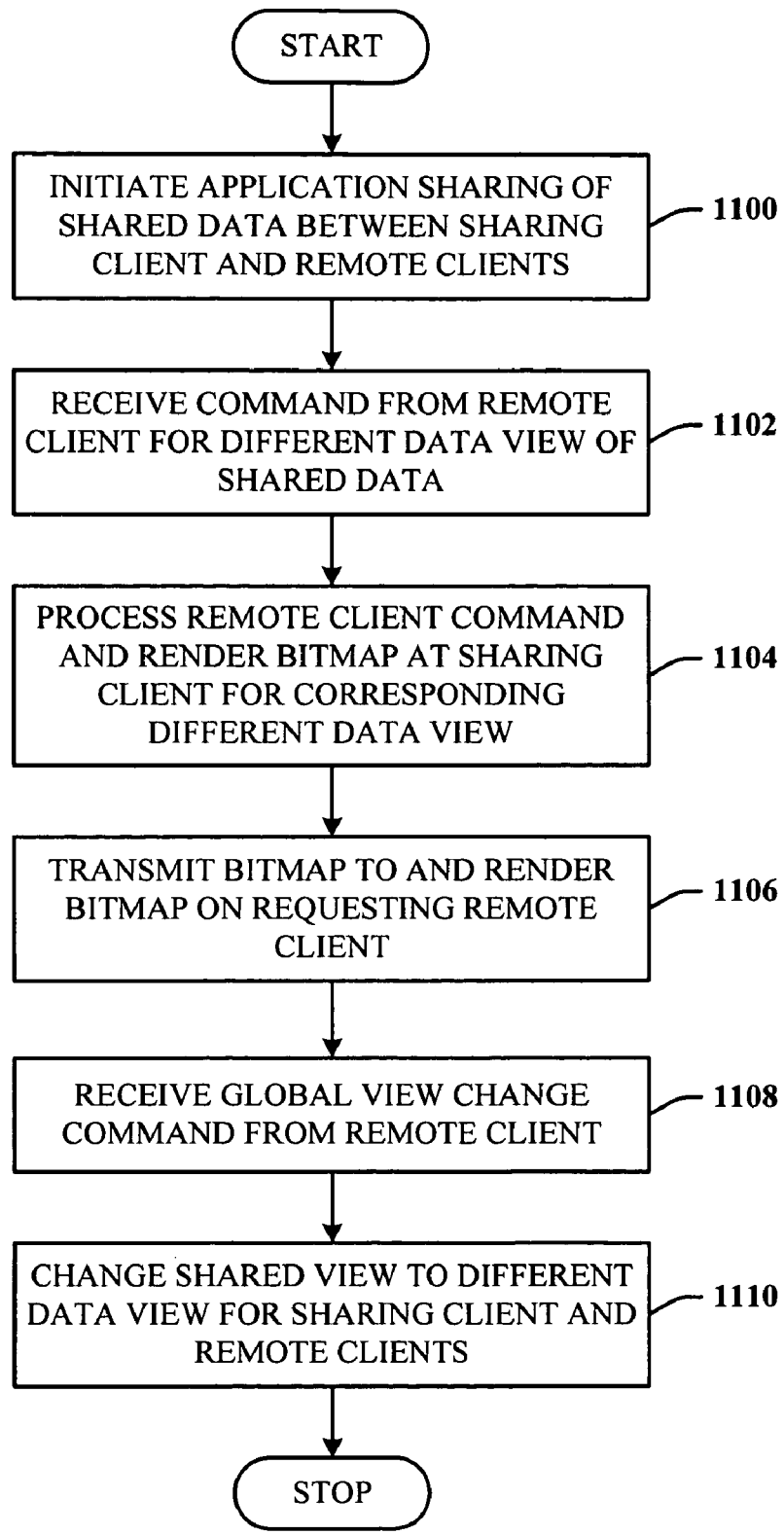
FIG. 11 illustrates a methodology of controlling a sharing application by a remote client.

FIG. 11 illustrates a methodology of controlling a sharing application by a remote client. At 1100, application sharing of data is initiated between a sharing client and a remote client. At 1102, shared data and enhanced controls are presented on a remote sharing client and commands are received from the remote clients for different data views of the shared data. At 1104, remote client commands are processed and associated bitmap data rendered by the sharing client for the corresponding different data views. At 1106, the bitmap data is transmitted to the corresponding requesting remote clients. At 1108, a global view change command is received from a remote client. At 1110, the original shared view is changed to the combined different data/shared view for both the sharing client and the other remote clients based on the global view change command.

Figure 12:
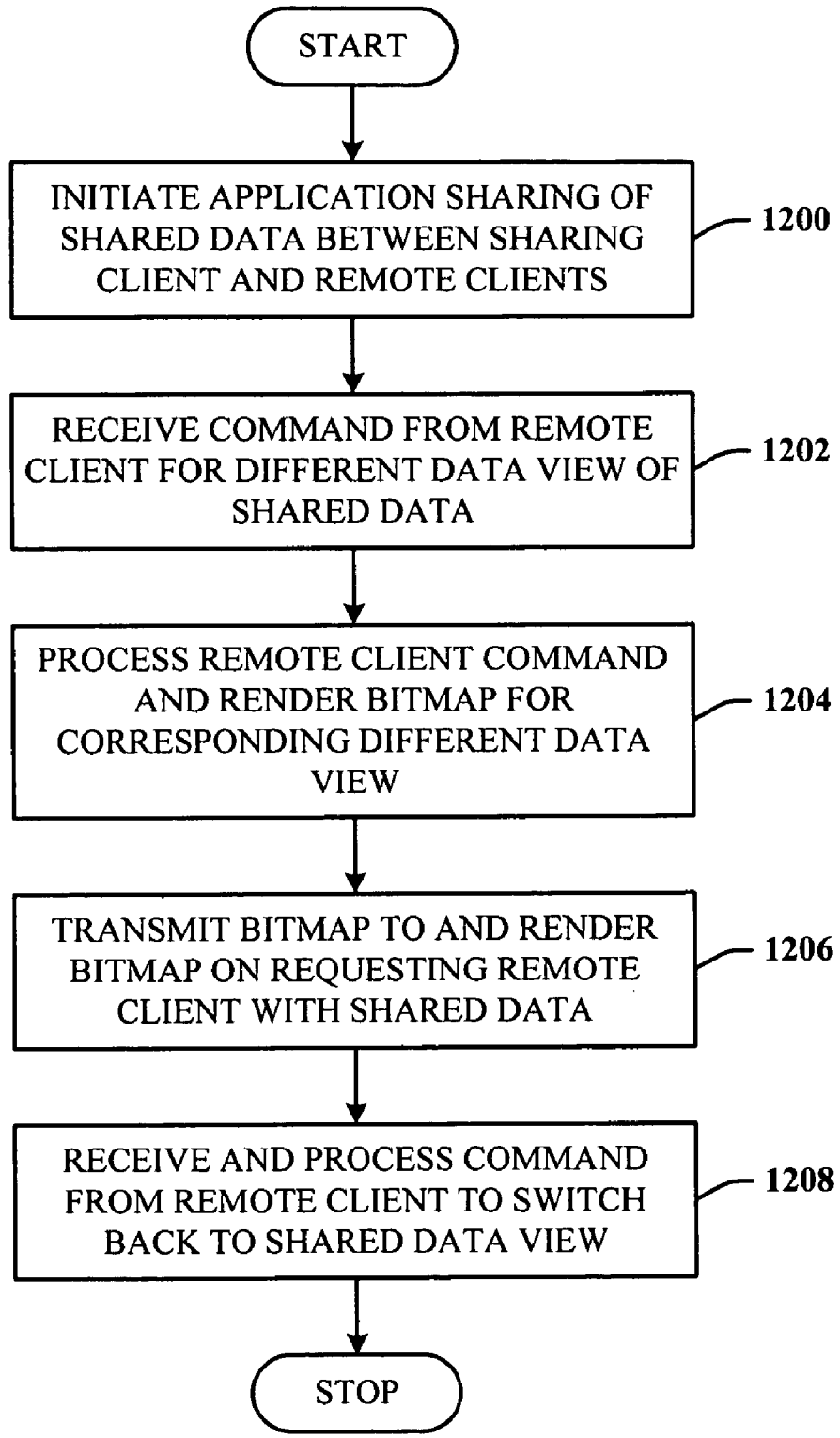
FIG. 12 illustrates a methodology of switching between a shared view and a different view on a remote client.

FIG. 12 illustrates a methodology of switching between a shared view and a different view on a remote client. At 1200, application sharing of data is initiated between a sharing client and a remote client. At 1202, shared data and enhanced controls are presented on a remote sharing client, and a command is received from the remote client for different data view of the shared data. At 1204, the remote client command is processed and associated bitmap data rendered for the corresponding different data view. At 1206, the bitmap data is transmitted to and rendered on the requesting remote client. At 1208, another command is received from the remote client and processed to switch from (or reset) the different data/shared data view to only the shared data view.

Figure 13:
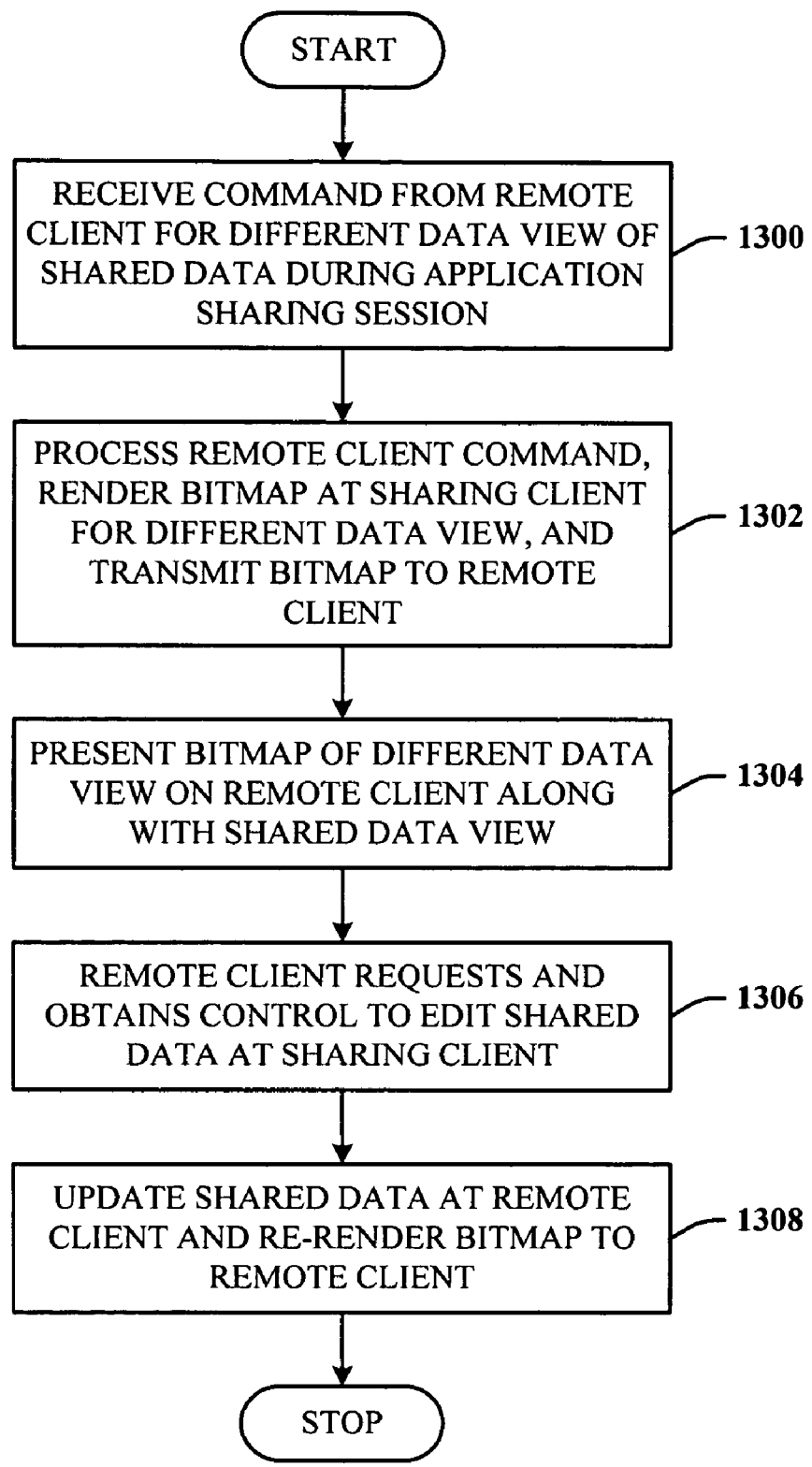
FIG. 13 illustrates a methodology of controlling shared data editing by a remote client.

FIG. 13 illustrates a methodology of controlling shared data editing by a remote client. At 1300, a command is received from the remote client for a different data view of the shared data during an application sharing session. At 1302, the remote client command is processed, associated bitmap data rendered by the sharing client for the corresponding different data view, and bitmap data sent to the remote client. At 1304, the bitmap data of the different data is rendered on the requesting remote client along with the shared data. At 1306, the remote client requests and obtains control from the sharing client to edit the shared data at the sharing client. At 1308, the updated shared data from the sharing client is propagated to the remote clients and bitmap data currently being viewed by one or more of the remote clients is re-rendered and sent to the respective remote clients.

Figure 14:
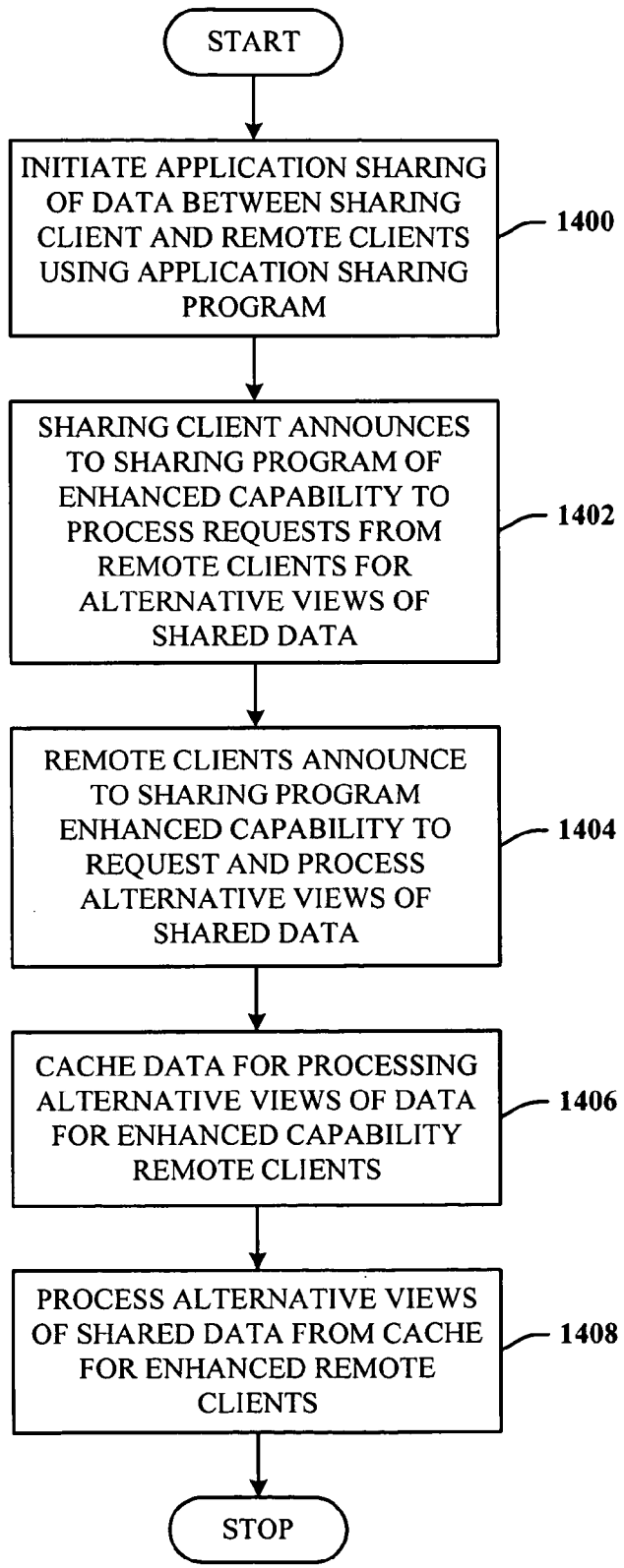
FIG. 14 illustrates a methodology of announcing enhanced sharing application capability when entering a sharing (or collaboration) session.

FIG. 14 illustrates a methodology of announcing enhanced sharing application capability when entering a sharing (or collaboration) session. At 1400, application sharing of data is initiated between a sharing client and remote clients using an application sharing program. At 1402, the sharing client announces to the sharing program of its enhanced capabilities to process requests from remote clients for alternative views of the shared data. At 1404, the remote clients announce to the client sharing program of enhanced capabilities to request and process alternative views of shared data. At 1406, data is cached for processing the alternative views of the shared data for the enhanced capability remote clients. At 1408, the alternative views of the shared data are processed from the cached data for the enhanced remote clients and sent to the enhanced remote clients for presentation.

Figure 15:
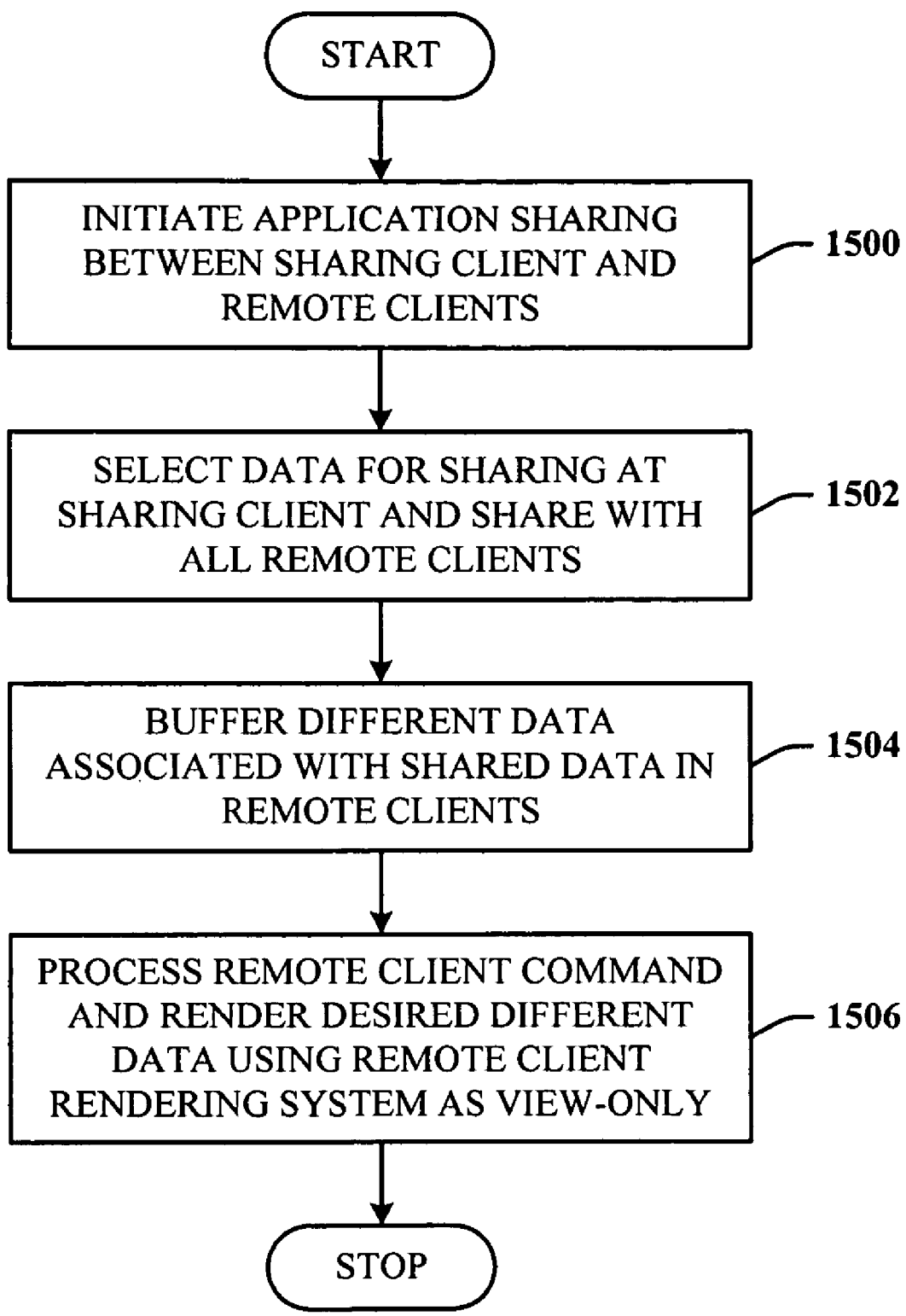
FIG. 15 illustrates a methodology of buffering data for remote client rendering of shared and/or different data.

FIG. 15 illustrates a methodology of buffering data for remote client rendering of shared and/or different data. At 1500, application sharing of data is initiated between a sharing client and remote clients using an application sharing program. At 1502, data is selected for sharing by the sharing client and shared with the remote clients. At 1504, different data associated with the shared data is buffered in the remote clients. At 1506, a remote client command is received and processed by the sharing client to render the different data using the client rendering system, as a view-only mode. It is to be appreciated that this mode be (or change to) an edit mode or annotation-only mode, for example.

Figure 16:
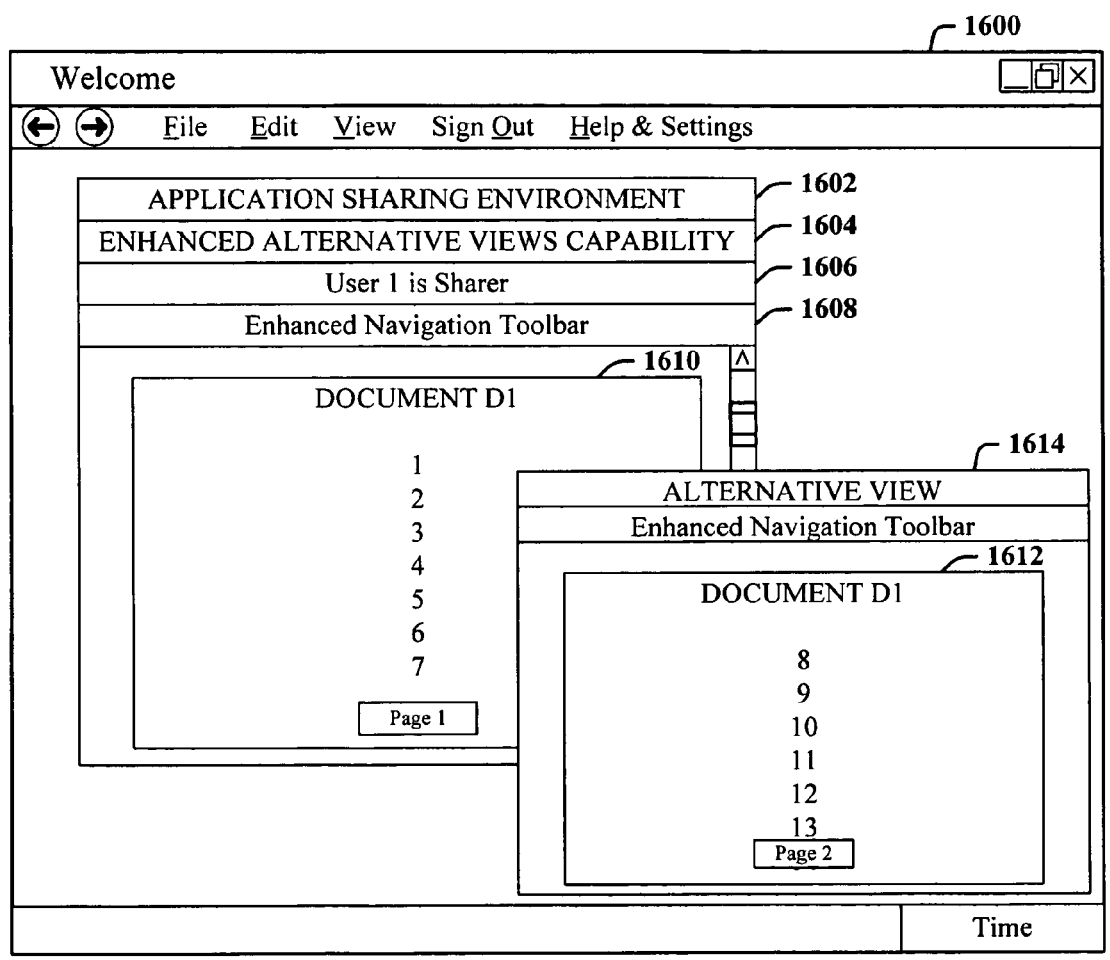
FIG. 16 illustrates an exemplary user interface of a remote client for presenting shared data and different data, as requested.

FIG. 16 illustrates an exemplary user interface 1600 of a remote client for presenting shared data and different data, as requested. The interface 1600 can include an application sharing environment window 1602 that is opened in response to accepting an invitation, for example, to participate in a sharing (or collaborative) session. The environment window 1602 can also include announcement information part of a header of the environment window 1602 that alerts the remote user that the remote client includes the capability of enhanced application sharing. The environment window 1602 can also include sharer (or sharing client) information 1606 that indicates the identity of the current sharer user (e.g., User 1, sharer machine name). The environment window 1602 can also include an enhanced navigation toolbar 1608 that provides enhanced controls for selection by the remote client user. For example, the toolbar 1608 can include scrollbars, previous/next selection buttons, and so on.

Currently, the sharing environment 1602 presents shared data 1610 as a document D1 having multiple pages. Only Page 1 is currently being viewed by all remote clients as the shared data 1610. In one implementation, in response to the sharing client causing presentation of the navigation toolbar 1608, the remote client user is made aware that different data (e.g., Page 2 of document D1) associated with the shared data 1610 is available for viewing. By selecting and causing a change in the shared data view, the system automatically processes the navigation action to determine the different data the remote client user wishes to view. For example, if the remote client user selects a next page tool, it can be inferred that the remote user desires to see the next page associated with the shared view data. Accordingly, the remote client sends an appropriate command (or request) to the sharing client in response to which a bitmap is made of the next page (Page 2) of the shared data 1610. The bitmap 1612 of the different data (Page 2 of document D1) is then returned to the remote client interface 1600 and presented in a separate alternative view window 1614. The alternative view window 1614 can also include a toolbar 1616 for navigating the bitmap 1612 of the different data in the alternative view. Yet another alternative view can be created by using pixel information which can be employed to represent the y coordinate of a mythical rendering of the document as one long strip. A percentage can also be utilized that can give the relative distance into the document of the view.

Once the remote client user no longer chooses to view the different data, the remote user can select another command from the navigation toolbar of the sharing environment window 1602 that causes the remote client to reset the view to only the shared data only, there by closing the alternative view window 1614.

The navigation toolbar 1608 can also provide the capability to take control from the sharing client and allow the remote client user to edit the shared data view for globally changing the shared data view for all clients.

While certain ways of displaying information to users are shown and described with respect to certain figures as screenshots, those skilled in the relevant art will recognize that various other alternatives can be employed. The terms "screen," "screenshot", "webpage," "document", and "page" are generally used interchangeably herein. The pages or screens are stored and/or transmitted as display descriptions, as graphical user interfaces, or by other methods of depicting information on a screen (whether personal computer, PDA, mobile telephone, or other suitable device, for example) where the layout and information or content to be displayed on the page is stored in memory, database, or another storage facility.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 17:
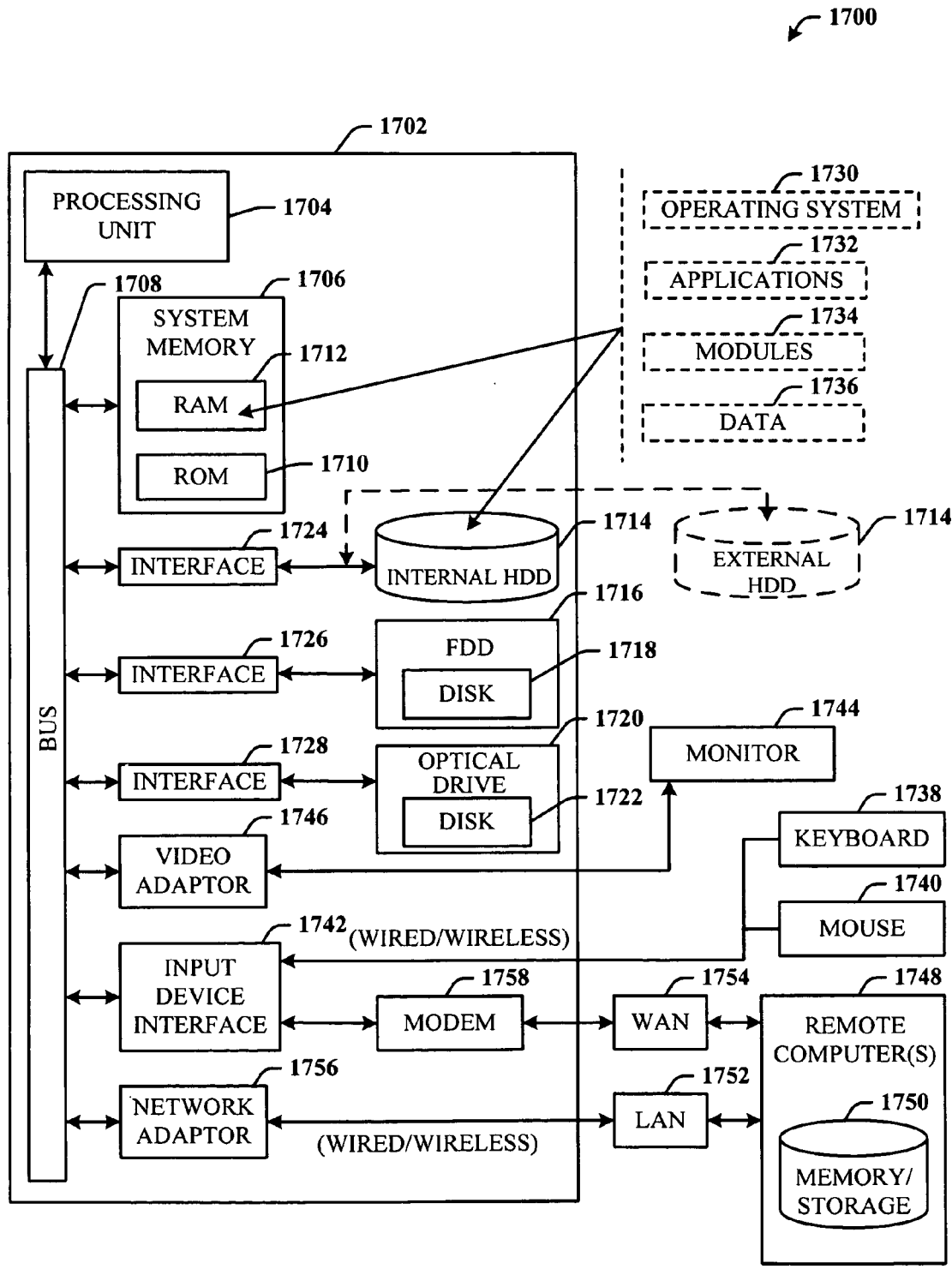
FIG. 17 illustrates a block diagram of a computing system operable to execute the disclosed enhanced sharing application capabilities and rendering for remote client rendering of different data.

Referring now to FIG. 17, there is illustrated a block diagram of a computing system 1700 operable to execute the disclosed enhanced sharing application capabilities and rendering for remote client rendering of different data. In order to provide additional context for various aspects thereof, FIG. 17 and the following discussion are intended to provide a brief, general description of a suitable computing system 1700 in which the various aspects of the innovation can be implemented. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 17, the exemplary computing system 1700 for implementing various aspects includes a computer 1702, the computer 1702 including a processing unit 1704, a system memory 1706 and a system bus 1708. The system bus 1708 provides an interface for system components including, but not limited to, the system memory 1706 to the processing unit 1704. The processing unit 1704 can be any of various commercially available processors. Dual microprocessors and other multi-processor architectures can also be employed as the processing unit 1704.

The system bus 1708 can be any of several types of bus structure that can further interconnect to a memory bus (with or without a memory controller), a peripheral bus, and a local bus using any of a variety of commercially available bus architectures. The system memory 1706 includes read-only memory (ROM) 1710 and random access memory (RAM)

1712. A basic input/output system (BIOS) is stored in a non-volatile memory 1710 such as ROM, EPROM, EEPROM, which BIOS contains the basic routines that help to transfer information between elements within the computer 1702, such as during start-up. The RAM 1712 can also include a high-speed RAM such as static RAM for caching data.

The computer 1702 further includes an internal hard disk drive (HDD) 1714 (e.g., EIDE, SATA), which internal hard disk drive 1714 can also be configured for external use in a suitable chassis (not shown), a magnetic floppy disk drive (FDD) 1716, (e.g., to read from or write to a removable diskette 1718) and an optical disk drive 1720, (e.g., reading a CD-ROM disk 1722 or, to read from or write to other high capacity optical media such as the DVD). The hard disk drive 1714, magnetic disk drive 1716 and optical disk drive 1720 can be connected to the system bus 1708 by a hard disk drive interface 1724, a magnetic disk drive interface 1726 and an optical drive interface 1728, respectively. The interface 1724 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1702, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1712, including an operating system 1730, one or more application programs 1732, other program modules 1734 and program data 1736. All or portions of the operating system, applications, modules, and/or data can also be cached in the RAM 1712. It is to be appreciated that the innovation can be implemented with various commercially available operating systems or combinations of operating systems.

The one or more application programs 1732, other program modules 1734 and program data 1736 can include the rendering and/or enhanced application sharing functionality described herein.

A user can enter commands and information into the computer 1702 through one or more wired/wireless input devices, for example, a keyboard 1738 and a pointing device, such as a mouse 1740. Other input devices (not shown) can include a microphone, an IR remote control, a joystick, a game pad, a stylus pen, touch screen, or the like. These and other input devices are often connected to the processing unit 1704 through an input device interface 1742 that is coupled to the system bus 1708, but can be connected by other interfaces, such as a parallel port, an IEEE 1394 serial port, a game port, a USB port, an IR interface, etc.

A monitor 1744 or other type of display device is also connected to the system bus 1708 via an interface, such as a video adapter 1746. In addition to the monitor 1744, a computer typically includes other peripheral output devices (not shown), such as speakers, printers, etc.

The computer 1702 can operate in a networked environment using logical connections via wired and/or wireless communications to one or more remote computers, such as a remote computer(s) 1748. The remote computer(s) 1748 can be a workstation, a server computer, a router, a personal computer, portable computer, microprocessor-based entertainment appliance, a peer device or other common network node, and typically includes many or all of the elements described relative to the computer 1702, although, for purposes of brevity, only a memory/storage device 1750 is illustrated. The logical connections depicted include wired/wireless connectivity to a local area network (LAN) 1752 and/or larger networks, for example, a wide area network (WAN) 1754. Such LAN and WAN networking environments are commonplace in offices and companies, and facilitate enterprise-wide computer networks, such as intranets, all of which can connect to a global communications network, for example, the Internet.

When used in a LAN networking environment, the computer 1702 is connected to the local network 1752 through a wired and/or wireless communication network interface or adapter 1756. The adaptor 1756 can facilitate wired or wireless communication to the LAN 1752, which can also include a wireless access point disposed thereon for communicating with the wireless adaptor 1756.

When used in a WAN networking environment, the computer 1702 can include a modem 1758, or is connected to a communications server on the WAN 1754, or has other means for establishing communications over the WAN 1754, such as by way of the Internet. The modem 1758, which can be internal or external and a wired or wireless device, is connected to the system bus 1708 via the serial port interface 1742. In a networked environment, program modules depicted relative to the computer 1702, or portions thereof, can be stored in the remote memory/storage device 1750. It will be appreciated that the network connections shown are exemplary and other means of establishing a communications link between the computers can be used.

The computer 1702 is operable to communicate with any wireless devices or entities operatively disposed in wireless communication, for example, a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Figure 18:
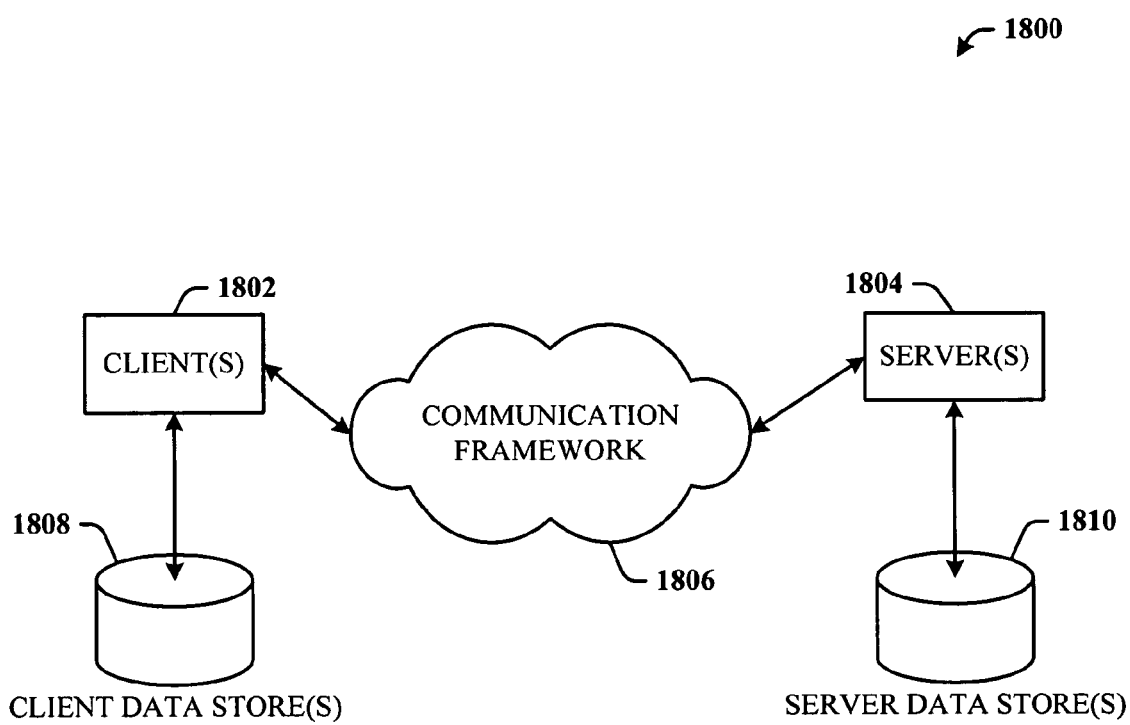
FIG. 18 illustrates a schematic block diagram of an exemplary computing environment that facilitates the disclosed enhanced sharing application capabilities and rendering for remote client rendering of different data.

Referring now to FIG. 18, there is illustrated a schematic block diagram of an exemplary computing environment 1800 that facilitates the disclosed enhanced sharing application capabilities and rendering for remote client rendering of different data. The system 1800 includes one or more client(s) 1802. The client(s) 1802 can be hardware and/or software (e.g., threads, processes, computing devices). The client(s) 1802 can house cookie(s) and/or associated contextual information by employing the subject innovation, for example.

The system 1800 also includes one or more server(s) 1804. The server(s) 1804 can also be hardware and/or software (e.g., threads, processes, computing devices). The servers 1804 can house threads to perform transformations by employing the architecture, for example. One possible communication between a client 1802 and a server 1804 can be in the form of a data packet adapted to be transmitted between two or more computer processes. The data packet can include a cookie and/or associated contextual information, for example. The system 1800 includes a communication framework 1806 (e.g., a global communication network such as the Internet) that can be employed to facilitate communications between the client(s) 1802 and the server(s) 1804.

Communications can be facilitated via a wired (including optical fiber) and/or wireless technology. The client(s) 1802 are operatively connected to one or more client data store(s) 1808 that can be employed to store information local to the client(s) 1802 (e.g., cookie(s) and/or associated contextual information). Similarly, the server(s) 1804 are operatively connected to one or more server data store(s) 1810 that can be employed to store information local to the servers 1804.

As described in one example above, one of the servers 1804 can host the enhanced application sharing component and rendering component functionality for the clients 1802. In such an implementation, one of the clients 1802, called a sharing client, can initiate data sharing via one of the servers 1804 to others of the clients 1802. Bitmap rendering by the sharing client can then be processed through the servers 1804 for transmission back to the other clients. In another example, one of the servers 1804 hosts the collaboration (or sharing) environment wherein content or data to be shared is presented for remote viewing on the server.

What has been described above includes examples of the disclosed innovation. It is, of course, not possible to describe every conceivable combination of components and/or methodologies, but one of ordinary skill in the art can recognize that many further combinations and permutations are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented method of managing an application, the method comprising:
   initiating application sharing between a sharing client and remote clients, the remote clients comprising at least one buffering remote client;
   transmitting a shared view of application data from the sharing client to the remote clients;
   rendering the shared view at the remote clients via remote client applications executing at the remote clients;
   displaying the shared view at the remote clients;
   receiving, at the sharing client, a request from a requesting remote client for accessing non-displayed application data, the requesting remote client comprising one of the remote clients and the non-displayed application data corresponding to application data that is not being displayed at the sharing client or the remote clients;
   rendering, at the sharing client, rendered data corresponding to the non-displayed application data;
   packaging, at the sharing client, the rendered data as bitmap data;
   transmitting the bitmap data and positioning coordinate data to the requesting remote client, the positioning coordinate data indicating where to display the bitmap data on a requesting remote client display;
   receiving a global view change request from the requesting remote client, the global view change request comprising a request to change the shared view visible on the remote clients to a view comprising the shared data and the non-displayed application data data as displayed at the requesting remote client;
   transmitting the bitmap data and the positioning coordinate data to the remote clients and the buffering remote client and displaying the bitmap data and the shared data on the sharing client;
   transmitting the non-displayed application data to the buffering remote client for rendering and display at the buffering remote client;
   displaying the bitmap data and the shared data at the remote clients; and
   rendering and displaying the non-displayed application data at the buffering remote client.

2. The method of claim 1, further comprising presenting enhanced navigation controls on the remote clients, the enhanced navigation controls for requesting the not-displayed application data.

3. The method of claim 1, further comprising allowing the remote clients to obtain control over the shared data of the sharing client via the application sharing component to edit the shared data.

4. The method of claim 1, further comprising resetting rendering of the not-displayed application data in response to receiving a reset command from at least one of the remote clients.

5. The method of claim 1, further comprising:
   re-rendering the not-displayed data; and
   transmitting the re-rendered not-displayed application data and the shared data to the remote clients based upon a change to the shared data received from one of the remote clients.

6. The method of claim 1, further comprising:
   presenting a control at the requesting remote client; and
   receiving the request from the requesting remote client in response to interaction with the control at the requesting remote client.

7. The method of claim 1, further comprising overlaying the bitmap data on the shared view rendered at the requesting remote client.

8. The method of claim 1, further comprising re-rendering the not-displayed application data based on a change in the shared view.

9. The method of claim 1, further comprising buffering the application data and updating the buffered application data in response to a change in the shared view.

* * * * *